United States Patent [19]

Namiki et al.

[11] Patent Number: 4,672,469
[45] Date of Patent: Jun. 9, 1987

[54] DELAY TIME ADJUSTING SYSTEM FOR VIDEO SIGNAL REPRODUCING APPARATUS HAVING HEADS SCANNING ACROSS MULTIPLE TRACKS

[75] Inventors: Yasuomi Namiki, Yokohama; Koji Arai, Tokyo, both of Japan

[73] Assignee: Victor Company of Japan, Ltd., Yokohama, Japan

[21] Appl. No.: 644,210

[22] Filed: Aug. 24, 1984

[30] Foreign Application Priority Data

Aug. 26, 1983 [JP] Japan .................................. 58-155775
Aug. 26, 1983 [JP] Japan .................................. 58-155776

[51] Int. Cl.⁴ ........................ H04N 9/83; H04N 5/93
[52] U.S. Cl. .................................. 358/312; 358/325; 360/10.3; 360/36.1; 360/64
[58] Field of Search ............... 358/312, 320, 321, 324, 358/325, 337, 338, 339; 360/10.3, 21, 36.1, 38.1, 64, 10.1, 7, 33.1; 369/60

[56] References Cited

U.S. PATENT DOCUMENTS

| 4,005,473 | 1/1977 | Hjortzberg | 358/320 |
| 4,005,476 | 1/1977 | Dickopp et al. | 360/36.1 X |
| 4,093,959 | 6/1978 | Hedlund | 358/312 X |
| 4,197,562 | 4/1980 | Kikuya et al. | 360/10.3 |
| 4,268,875 | 5/1981 | Morio et al. | 358/312 |
| 4,283,737 | 8/1981 | Nikami | 358/312 |
| 4,283,744 | 8/1981 | Melwisch et al. | 360/10.3 |
| 4,293,880 | 10/1981 | Tsukada et al. | 360/64 X |
| 4,400,741 | 8/1983 | Sekimoto et al. | 358/312 |
| 4,426,666 | 1/1984 | Kobayashi et al. | 358/312 X |
| 4,456,932 | 6/1984 | Honjo et al. | 360/36.1 |
| 4,486,792 | 12/1984 | Edakubo et al. | 360/10.2 |
| 4,491,878 | 1/1985 | Toba | 358/312 X |

FOREIGN PATENT DOCUMENTS 0024850 3/1981 European Pat. Off. .
0102809 3/1984 European Pat. Off. .

Primary Examiner—Raymond F. Cardillo
Assistant Examiner—Wayne R. Young
Attorney, Agent, or Firm—Roberts, Spiecens & Cohen

[57] ABSTRACT

A delay time adjusting system comprises a comparing circuit for comparing levels of reproduced frequency modulated signals from a pair of rotary heads which simultaneously scan over a magnetic tape, where the rotary heads have gaps of mutually different azimuth angles, a head selecting circuit responsive to an output signal of the comparing circuit, for selectively producing the reproduced signal from the rotary head having the greater level, a signal processing circuit for obtaining a reproduced video signal from the reproduced signal which is selectively produced from the head selecting circuit, a variable delay circuit for delaying the reproduced video signal from the signal processing circuit by a delay time, and a delay control signal generating circuit for variably controlling the delay time of the variable delay circuit so that the variable delay circuit produces a reproduced video signal in which reproduced horizontal synchronizing signals have a constant period.

10 Claims, 64 Drawing Figures

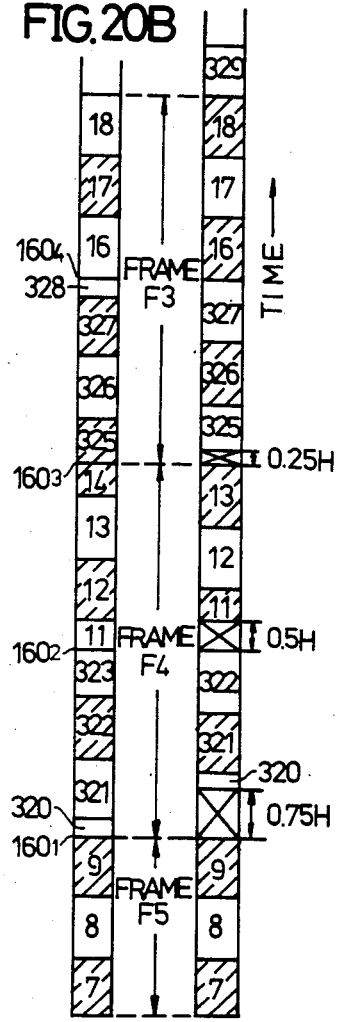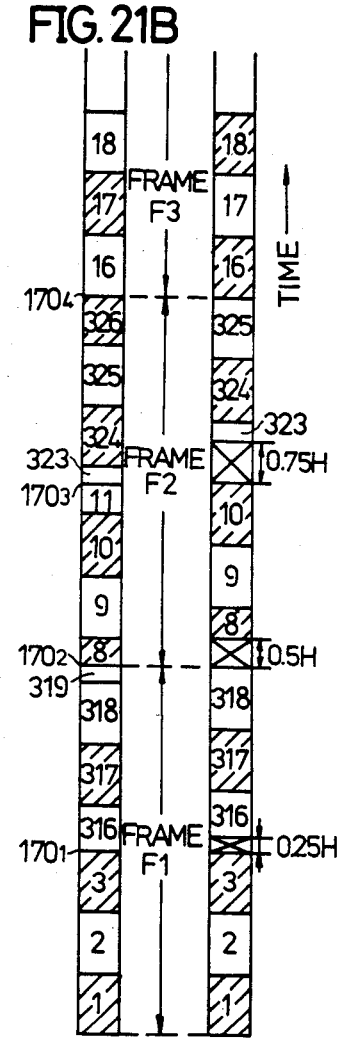

DELAY TIME ADJUSTING SYSTEM FOR VIDEO SIGNAL REPRODUCING APPARATUS HAVING HEADS SCANNING ACROSS MULTIPLE TRACKS

BACKGROUND OF THE INVENTION

The present invention generally relates to delay time control apparatus for controlling delay times at the time of a changed speed reproduction mode, and more particularly to a delay time control apparatus for controlling one or two delay times of one or two delay circuits which delay a reproduced signal from a rotary head. A magnetic tape which is played, is recorded at the time of a recording mode by rotary heads having gaps of mutually different azimuth angles, and is at least recorded with a frequency modulated video signal. The magnetic tape has a track pattern in which recorded positions of horizontal synchronizing signals on two mutually adjacent tracks are not aligned in the width direction of the tracks and are shifted in the longitudinal direction of the tracks. The delay time control apparatus according to the present invention controls the one or two delay times so that it is possible to obtain a stable reproduced signal accompanying no skew phenomenon and having no color disappearance at the time of the change speed reproduction mode in which the magnetic tape moves at a tape speed different from the tape speed at the time of the recording mode. The skew phenomenon and the color disappearance will be described later on in the specification.

A magnetic recording and reproducing apparatus (video tape recorder or VTR) employing the azimuth recording and reproducing system, is well known. A magnetic tape which is recorded in a standard mode of the VTR, usually has a track pattern in which recorded positions of horizontal synchronizing signals on two mutually adjacent tracks are aligned in the width direction of the tracks (so-called H-alignment). Accordingly, in a case where a PAL system color video signal is recorded on the magnetic tape, for example, the recorded positions of the horizontal synchronizing signals on two mutually adjacent tracks are aligned in the width direction of the tracks. Moreover, in this case, recorded sections of one horizontal scanning period (1H), containing modulated waves obtained by modulating chrominance subcarriers having inverted phases by color difference signals (R-Y), are also recorded on the mutually adjacent tracks in alignment along the width direction of the tracks.

Recently, the recording and reproducing time of the VTR has become extended. When extending the recording and reproducing time, the length of the magnetic tape, the diameter of a drum, and the length of the track on which the video signal is recorded, remain unchanged. The track widths of rotary heads are made extremely narrow, and the tape speed is reduced to ½ the tape speed of the standard mode, for example, so as to extend the recording time to twice the recording time which is obtainable in the standard mode. In this case, a difference between starting positions of two mutually adjacent tracks becomes equal to ½ the difference between starting positions of two mutually adjacent tracks which are formed at the time of the standard mode. As a result, the H-alignment does not exist in the track pattern which is formed during an extended time mode in which the recording time is extended. Accordingly, in the track pattern which is formed during the extended time mode, the recorded sections of 1H, containing the modulated waves obtained by modulating the chrominance subcarriers having the inverted phases by the color difference signals (R-Y), are recorded on the mutually adjacent tracks in non-alignment along the width direction of the tracks.

The existence of the H-alignment in the track pattern formed on the magnetic tape, greatly affects a so-called changed speed reproduction mode (or special reproduction mode) in which the magnetic tape moves at a tape speed which is different from the tape speed at the time of the recording mode. In other words, because the tape speed at the time of the change speed reproduction mode is different from the tape speed at the time of the recording mode, a scanning locus of one rotary head crosses over a plurality of tracks. Hence, in addition to tracks which are pre-recorded by a rotary head having a gap of the same azimuth angle as the gap of the reproducing rotary head, the reproducing rotary head also scans over reverse tracks which are pre-recorded by a rotary head having a gap of an azimuth angle different from the azimuth angle of the gap of the reproducing rotary head. In other words, a so-called reverse or opposite tracking takes place. When a large portion of an area on the magnetic tape in contact with the reproducing rotary head belongs to the reverse track, there is a great decrease in the level of the reproduced signal due to the azimuth loss effect, and a noise bar is generated in the reproduced picture.

However, in a case where the magnetic tape is prerecorded in the standard mode so that the H-alignment exists and the changed speed reproduction is carried out with this magnetic tape, the horizontal synchronizing signals are constantly reproduced with an interval of 1H. In addition, the color difference signals (R-Y) are reproduced so that the recorded section of 1H containing the carrier having the inverted phase and the recorded section of 1H containing the carrier having the non-inverted phase are alternately reproduced. For this reason, the reproduced PAL system color video signal is the same as the pre-recorded PAL system color video signal, as to the periodicity of the reproduced horizontal synchronizing signals and the sequence of the reproduced carrier chrominance signals.

On the other hand, in a case where the changed speed reproduction is carried out with respect to a magnetic tape which is recorded in the extended time mode and has a track pattern in which the H-alignment does not exist, the noise bar is generated in the reproduced signal from the reproducing rotary head when a large portion of the area on the magnetic tape in contact with the reproducing rotary head belongs to the reverse track. In addition, the interval of the reproduced horizontal synchronizing signals becomes equal to 1H/2, for example, and the sequence of the reproduced carrier chrominance signals becomes disordered. For this reason, when carrying out the changed speed reproduction with respect to the magnetic tape having the track pattern in which the H-alignment does not exist, the periodicity of the reproduced horizontal synchronizing signal becomes disordered as the reproducing rotary head scans across the reverse track. Hence, when the reproduced frequency modulated video signal is simply subjected to a frequency demodulation and is then supplied to a monitoring display device, the reproduced picture will be distorted in the horizontal direction of the picture (so-called skew phenomenon), and the color disappears at a part of the reproduced picture (hereinafter referred to as a color disappearance). As a result, it is only possible to obtain a reproduced picture having a poor picture quality.

Accordingly, in a conventional apparatus, a skew part of a reproduced luminance signal, wherein a skew of 1H/2 is generated, is detected in a 1H/2 skew detecting circuit. An output detection signal of the 1H/2 skew detecting circuit is supplied to a first switching circuit as a first switching signal. The first switching circuit selectively produces one of a reproduced color video signal in which the reproduced luminance signal and a reproduced carrier chrominance signal of the PAL system, for example, is multiplexed, and a delayed reproduced color video signal which is obtained by delaying the reproduced color video signal by a delay time of 1H/2 in a 1H/2-delay circuit. In a state where the first switching circuit is producing one of the reproduced color video signal and the delayed color video signal, the first switching circuit is switched to produce the other of the reproduced color video signal and the delayed color video signal, responsive to the first switching signal (the output detection signal of the 1H/2 skew detecting circuit). Thus, a reproduced color video signal in which the periodicity of the reproduced horizontal synchronizing signal is maintained, is produced from the first switching circuit.

A color burst signal is extracted from the above reproduced color video signal, and the phase of the extracted color burst signal is detected in a phase detecting circuit. In a case where the sequence of the reproduced carrier chrominance signals is correct, a square wave which is inverted for every 1H is obtained from the phase detecting circuit. However, in a case where the sequence of the reproduced carrier chrominance signals (chrominance sequence) is incorrect, the periodicity of the output signal of the phase detecting circuit is disordered. A chrominance sequence discriminating circuit receives the output signal of the phase detecting circuit, and discriminates a disorder in the chrominance sequence from a disorder in the periodicity of the output signal of the phase detecting circuit. An output signal of the chrominance sequence discriminating circuit is supplied to a second switching circuit as a second switching signal. The second switching circuit is designed to selectively produce one of the reproduced carrier chrominance signal and a delayed reproduced carrier chrominance signal which is obtained by delaying the reproduced carrier chrominance signal by a delay time of 1H. In a state where the second switching circuit is producing one of the reproduced carrier chrominance signal and the delayed reproduced carrier chrominance signal, the second switching circuit is switched to produce the other of the reproduced carrier chrominance signal and the delayed reproduced carrier chrominance signal, responsive to the second switching signal (the output signal of the chrominance sequence discriminating circuit). The output signal of the second switching circuit is multiplexed with the reproduced luminance signal, and is supplied to the first switching circuit and to the 1H/2-delay circuit. As a result, a reproduced carrier chrominance signal having the correct chrominance sequence, is obtained from the second switching circuit.

However, in the conventional apparatus described heretofore, the delay time of the reproduced color video signal, that is, whether to delay the reproduced color video signal by the delay time of 1H/2 or not to delay the reproduced color video signal, is controlled responsive to the output detection signal of the 1H/2 skew detecting circuit. Moreover, the delay time of the reproduced carrier chrominance signal, that is, whether to delay the reproduced carrier chrominance signal by the delay time of 1H or not to delay the reproduced carrier chrominance signal, is controlled responsive to the output signal of the chrominance sequence discriminating circuit. Hence, it requires a complex analog signal processing in order to perform such control of the delay times. As a result, a circuit part for performing the analog signal processing occupies a large portion of the circuit in the apparatus, and it is difficult to make the circuit in the form of an integrated circuit (IC) and to perform the operations of the apparatus by use of a microprocessor.

Further, a rotary head for extended time mode play may be arranged extremely close to a rotary head for standard mode play. In this case, the two kinds of rotary heads are selectively used during the changed speed reproduction mode, and the noise bar which is generated when the reproducing rotary head scans over the reverse track, is greatly reduced. However, as will be described later on in the specification, a skew of 0.25H is generated in this case, and it is necessary to detect this skew of 0.25H in order to reduce the skew. But, it is difficult to stably detect the skew of 0.25H.

SUMMARY OF THE INVENTION

Accordingly, it is a general object of the present invention to provide a novel and useful delay time control apparatus for controlling delay times at the time of a changed speed reproduction mode, in which the problems described heretofore have been eliminated.

Another and more specific object of the present invention is to provide a delay time control apparatus comprising comparing means for comparing levels of reproduced frequency modulated signals from first and second rotary heads which have gaps of mutually different azimuth angles and simultaneously scan over a magnetic tape during a changed speed reproduction mode, head selecting means for selectively producing one of the reproduced signals from the first and second rotary heads having the larger level responsive to an output signal of the comparing means, demodulating means for demodulating the reproduced signal which is selectively produced from the head selecting means, a variable delay circuit for delaying a reproduced video signal from the demodulating means, and a control signal generating circuit for producing a control signal responsive to the output signal of the head selecting means, and for variably controlling a delay time of the variable delay circuit by the control signal so as to produce a reproduced video signal containing a reproduced synchronizing signal which has a constant period. According to the apparatus of the present invention, it is easier to perform a digital signal processing compared to the conventional apparatus. Hence, the circuit in the apparatus may be made in the form of an integrated circuit, and the operation of the apparatus may be performed by use of a microprocessor. The construction of the apparatus is simplified by the use of the integrated circuit and the microprocessor, and it is possible to reduce the size and weight of the apparatus. In a case where the skew of 1.25H which is generated during the changed speed reproduction mode is detected by use of the conventional analog signal processing, it is impossible to perform a stable detecting operation. However, because the levels of the reproduced frequency modulated signals from two rotary heads are compared according to the apparatus of the present invention, it is possible to accurately detect the positions of the rotary heads, and the skew can be detected more stably compared to the conventional apparatus.

Still another object of the present invention is to provide a delay time control apparatus in which the above control signal generating circuit generates another control signal during a changed speed reproduction mode. The magnetic tape which is played, is recorded with a frequency modulated luminance signal which is obtained by frequency-modulated a luminance signal in a PAL or SECAM system color video signal, and a frequency converted carrier chrominance signal which is obtained by frequency-converting a carrier chrominance signal of the PAL or SECAM system color video signal into a low frequency range. The other control signal controls another variable delay circuit which is different from the above variable delay circuit, so that the other variable delay circuit selectively delays a reproduced carrier chrominance signal or a reproduced frequency converted carrier chrominance signal by a delay time of one horizontal scanning period and produces a reproduced carrier chrominance signal having the correct chrominance sequence. According to the apparatus of the present invention, the reproduced carrier chrominance signal has the correct chrominance sequence, and it is possible to obtain a reproduced color picture of a high quality containing no color disappearance.

A further object of the present invention is to provide a delay time control apparatus which employs two rotary heads which have gaps of mutually different azimuth angles and simultaneously scan over the magnetic tape, wherein the rotary heads have a double-gap construction and a distance between the double gaps corresponds to one horizontal scanning period. According to the apparatus of the present invention, a difference between periodicities of the switching of the delay times at the time of a high-speed forward reproduction mode and at the time of a high-speed reverse (backward) reproduction mode, is small. For this reason, it is possible to simplify the construction of the apparatus.

Another object of the present invention is to provide a delay time control apparatus which employs two rotary heads which have gaps of mutually different azimuth angles and simultaneously scan over the magnetic tape, wherein one of the two rotary heads is a rotary head for extended time mode having a small track width, and the other of the two rotary heads is a rotary head for standard mode having a large track width. According to the apparatus of the present invention, it is possible to obtain a signal for controlling the delay time during the changed speed reproduction mode, without providing a rotary head exclusively for use in controlling the delay time. By selectively using the two rotary heads, it is possible to repeatedly reproduce the same field, and thus, it is possible to obtain a completely still reproduced picture. In addition, during the high-speed reproduction mode, it is possible to obtain a reproduced picture having an improved picture quality.

Still another object of the present invention is to provide a delay time control apparatus which comprises first comparing means for comparing levels of reproduced frequency modulated signals from two rotary heads which are provided close to each other and have gaps of mutually different azimuth angles. An output signal of the first comparing means is passed through an integrating circuit, so as to generate a signal in synchronism with a frequency component which is related to a number of times recorded tracks on the magnetic tape are scanned across by the rotary heads, and this signal is used to generate delay control signals which control the delay time. According to the apparatus of the present invention, pulses which mix into the output signal of the first comparing means due to unstable contact between the magnetic tape and the rotary heads or the like, are discriminated as noise and are ignored. For this reason, it is possible to stably generate the delay control signals, and the delay time can be controlled accurately.

A further object of the present invention is to provide a delay time control apparatus in which a signal which is used as a reference for generating a signal for controlling the delay time, is generated in a phase locked loop. A center frequency of a variable frequency oscillator within the phase locked loop is set by a voltage which is produced responsive to detection pulses which are obtained by detecting a rotation of a capstan. According to the apparatus of the present invention, it is possible to accurately control the delay time by use of a circuit having a relatively simple circuit construction. Moreover, it is possible to generate predetermined delay controls signal with respect to arbitrary reproducing speeds, and it is possible to stably control the delay time even in a transient state where the tape moving speed changes.

Another object of the present invention is to provide a delay time control apparatus which comprises second comparing means for comparing levels of a reference voltage and a signal in synchronism with a frequency component which is related to a number of times recorded tracks on the magnetic tape are scanned across by two rotary heads which simultaneously scan over the magnetic tape. An output signal of the second comparing means is used as a switching signal for selectively producing one of the reproduced signals from the two rotary heads. In addition, the output signal of the second comparing means is also used as a reference signal for a circuit which generates delay control signals for controlling the delay time. According to the apparatus of the present invention, the reference voltage may be selected so that the reproduced signal from one of the two rotary heads having the larger track width is selectively obtained for a longer period of time. Hence, it is possible to prevent the picture quality of the reproduced picture from becoming deteriorated at parts where the switching is performed to change the rotary head from which the reproduced signal is obtained.

Other objects and further features of the present invention will be apparent from the following detailed description when read in conjunction with the accompanying drawings.

BRIEF DESCRIPTION OF THE DRAWINGS

FIGS. 17(A) through 17(0) show signal waveforms for explaining the operation of the circuit shown in FIG. 16;

FIGS. 20B and 20C schematically show the sequences of reproduced information contents of the reproduced color video signal when the the head scans along the head scanning locus shown in FIG. 20A, in a case where the delay time is not controlled and in a case where the delay time is controlled;

FIGS. 21B and 21C schematically show the sequences of reproduced information contents of the reproduced color video signal when the head scans along the head scanning locus shown in FIG. 21A, in a case where the delay time is not controlled and in a case where the delay time is controlled.

DETAILED DESCRIPTION

Figure 1A:
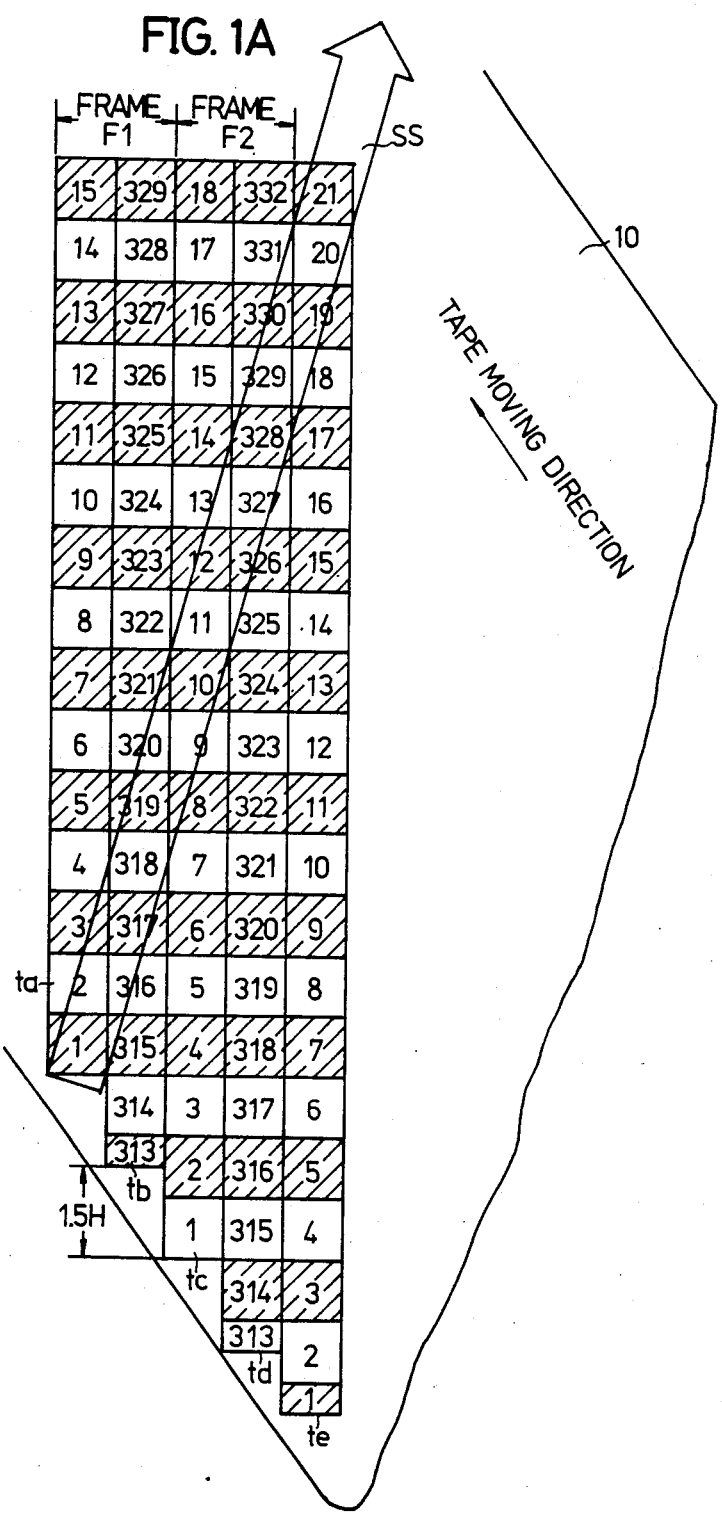
FIG. 1A shows an example of a part of a track pattern on a magnetic tape when a PAL system color video signal is recorded on the magnetic tape in a standard mode, and an example of a head scanning locus at the time of a changed speed reproduction mode.

FIG. 1A shows an example of a track pattern on a magnetic tape 10 when a PAL system color video signal is recorded in a standard mode of a video tape recorder (VTR) which employs an azimuth recording and reproducing system. In FIG. 1A, tracks $t_a$, $t_b$, $t_c$, $t_d$, and $t_e$ are formed obliquely to the longitudinal direction of the tape 10. Among the tracks $t_a$ through $t_e$, two mutually adjacent tracks are respectively formed by two rotary heads having gaps of mutually different azimuth angles. One field of the PAL system color video signal is recorded in each of the tracks $t_a$ through $t_e$, however, only the beginning portions of the tracks $t_a$ through $t_e$ are shown in FIG. 1A. The numbers illustrated in the tracks $t_a$ through $t_e$, each indicate the horizontal scanning line number and the recorded section in which the video signal of 1H (H indicates the horizontal scanning period) of this horizontal scanning line number is recorded.

As is well known, a PAL system carrier chrominance signal is a modulated wave which is obtained by subjecting chrominance subcarriers having predetermined frequencies to a carrier suppression quadrature amplitude modulation by two kinds of color difference signals (R-Y) and (B-Y). The phase of only the chrominance subcarrier which is modulated by the color difference signal (R-Y) between the two kinds of color difference signals, is inverted for every 1H. Hence, in FIG. 1A, a recorded section of 1H in which the phase of the first chrominance subcarrier which is modulated by the color difference signal (R-Y) differs by −90° (the phase of the first chrominance subcarrier is inverted) with respect to the phase of the second chrominance subcarrier which is modulated by the color difference signal (B-Y), is indicated by boxes with hatchings. A recorded section of 1H in which the phase of the first chrominance subcarrier differs by +90° with respect to the phase of the second chrominance subcarrier, is indicated by boxes without the hatchings. The same is true for FIGS. 1B, 2A, 2B, 20A through 20C, and 21A through 21C which will be described later on in the specification. As will be described later, the carrier chrominance signal is frequency-converted into a low frequency range and is recorded on the tracks on the tape 10. On the other hand, the luminance signal is frequency-modulated and is recorded on the tracks on the tape 10.

First and second frames of the recorded video signal, are respectively indicated by F1 and F2. Thus, the first frame F1 of the recorded video signal is recorded on the tracks $t_a$ and $t_b$, and the second frame F2 of the recorded video signal is recorded on the tracks $t_c$ and $t_d$. The tracks on the tape 10 are successively formed from the left to right in FIG. 1A. As may be seen from FIG. 1A, in the track pattern which is formed during the standard mode, the starting positions of two mutually adjacent tracks differ by 1.5H. For this reason, the recorded positions of the horizontal synchronizing signals are aligned in the width direction of the tracks between the mutually adjacent tracks. In addition, the first chrominance subcarriers which have inverted phases with respect to the phases of the second chrominance subcarriers and are modulated by the color difference signals (R-Y), are recorded in alignment along the width direction of the tracks.

Recently, the recording and reproducing time of the VTR is becoming extended. When extending the recording and reproducing time, the length of the magnetic tape, the diameter of a drum, and the length of one track on which the video signal is recorded, remain unchanged. The track widths of rotary heads are made extremely narrow, and the tape speed is reduced to ½ the tape speed at the time of the standard mode, for example, so as to extend the recording time to twice the recording time which is obtainable in the standard mode. In this case, a difference between the starting positions of two mutually adjacent tracks becomes equal to 0.75H which is ½ the difference between the starting positions of two mutually adjacent tracks which are formed at the time of the standard mode. As a result, the H-alignment does not exist in a track pattern shown in FIG. 2A which is formed during an extended time mode in which the recording time is extended. Accordingly, in the track pattern which is formed during the extended time mode, the recorded sections of 1H, containing the modulated waves obtained by modulating the chrominance subcarriers having the inverted phases by the color difference signals (R-Y), are recorded on the mutually adjacent tracks in non-alignment along the width direction of the tracks.

Figure 1B:
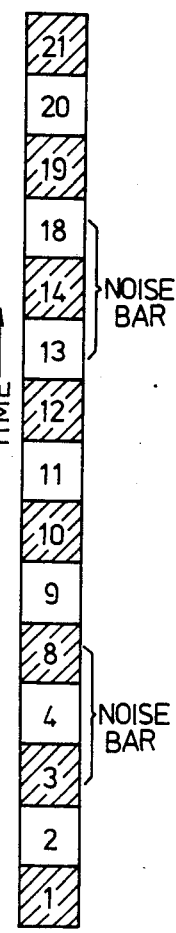
FIG. 1B schematically shows an example of a sequence of reproduced information contents of a reproduced color video signal when the track pattern shown in FIG. 1A is reproduced in the changed speed reproduction mode.

The existence of the H-alignment in the track pattern formed on the magnetic tape, greatly affects a so-called changed speed reproduction mode (or special reproduction mode) in which the magnetic tape moves at a tape speed which is different from the tape speed at the time of the recording mode. In other words, because the tape speed at the time of the change speed reproduction mode is different from the tape speed at the time of the recording mode, a scanning locus of one rotary head crosses over a plurality of tracks. Hence, in addition to tracks which are pre-recorded by a rotary head having a gap of the same azimuth angle as the gap of the reproducing rotary head, the reproducing rotary head also scans over reverse tracks which are pre-recorded by a rotary head having a gap of an azimuth angle different from the azimuth angle of the gap of the reproducing rotary head. In other words, a so-called reverse or opposite tracking takes place. In a case where the tape 10 having the track pattern shown in FIG. 1A in which the H-alignment exists, is played in the changed speed reproduction mode, one reproducing rotary head scans over a scanning locus SS shown in FIG. 1A, for example. In this case, the reproduced signal from this one reproducing rotary head is as shown in FIG. 1B. In FIGS. 1A and 1B, when a large portion of an area on the tape 10 in contact with the reproducing rotary head belongs to the reverse track, there is a great decrease in the level of the reproduced signal due to the azimuth loss effect, and a noise bar is generated in the reproduced picture. A period in a vicinity of the horizontal scanning line number "4" of the first frame F1 and the horizontal scanning line number "14" in the second frame F2, are such places where the noise bar is generated. However, as shown in FIG. 1B, the horizontal synchronizing signal is constantly reproduced with an interval of 1H. In addition, the color difference signals (R-Y) are reproduced so that the recorded section of 1H indicated the boxes with the hatchings and contains the chrominance subcarrier having the inverted phase and the recorded section of 1H indicated by the boxes without the hatchings and contains the chrominance subcarrier having the non-inverted phase, are alternately reproduced. For this reason, the reproduced PAL system color video signal is the same as the pre-recorded PAL system color video signal, as to the periodicity of the reproduced horizontal synchronizing signals and the sequence of the reproduced carrier chrominance signals.

Figure 2A:
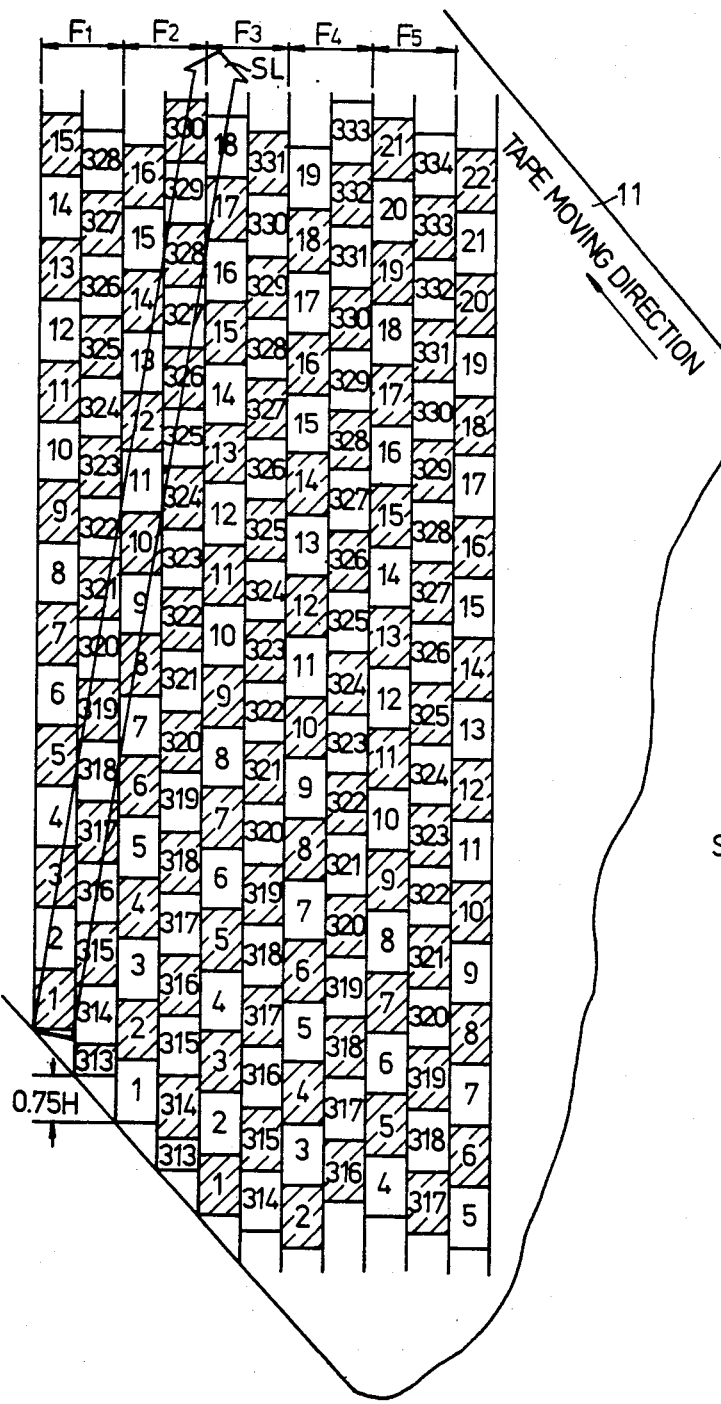
FIG. 2A shows an example of a part of a track pattern on the magnetic tape when the PAL system color video signal is recorded on the magnetic tape in an extended time mode, and an example of a head scanning locus at the time of the changed speed reproduction mode.
Figure 2B:
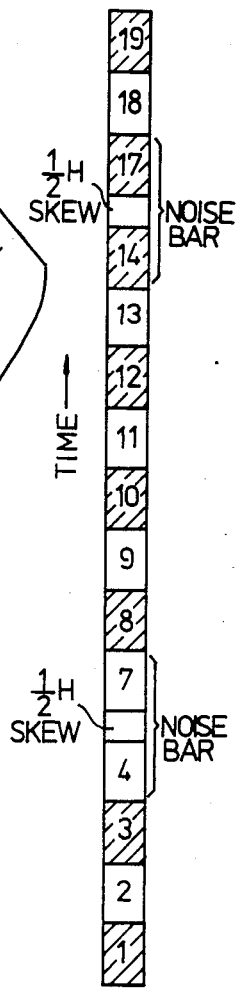
FIG. 2B schematically shows an example of the sequence of reproduced information contents of the reproduced color video signal when the track pattern shown in FIG. 2A is reproduced in the changed speed reproduction mode.

On the other hand, in a case where the changed speed reproduction is carried out with respect to a magnetic tape 11 which is recorded in the extended time mode and has the track pattern shown in FIG. 2A in which the H-alignment does not exist, one reproducing rotary head scans over a scanning locus SL shown in FIG. 2A, for example. In this case, a reproduced signal from the reproducing rotary head becomes as shown in FIG. 2B. The noise bar is generated in the reproduced signal from the reproducing rotary head when a large portion of the area on the tape 11 in contact with the reproducing rotary head belongs to the reverse track. A period in a vicinity of the horizontal scanning line number "4" of the first frame F1, the horizontal scanning line number "7" of the second frame F2, the horizontal scanning line number "14" of the second frame F2, and a horizontal scanning line number "17" of a third frame F3, are such places where the noise bar is generated. In addition, the interval of the reproduced horizontal synchronizing signals becomes equal to 1H/2, for example, and the sequence of the reproduced carrier chrominance signals becomes disordered. For this reason, when carrying out the changed speed reproduction with respect to the magnetic tape 11 having the track pattern in which the H-alignment does not exist, the periodicity of the reproduced horizontal synchronizing signal becomes disordered as the reproducing rotary head scans across the reverse track. Hence, when the reproduced frequency modulated video signal is simply subjected to a frequency demodulation and is then supplied to a monitoring display device, the reproduced picture will be distorted in the horizontal direction of the picture (so-called skew phenomenon), and the color disappears at a part of the reproduced picture (hereinafter referred to as a color disappearance). As a result, it is only possible to obtain a reproduced picture having a poor picture quality.

Figure 3:
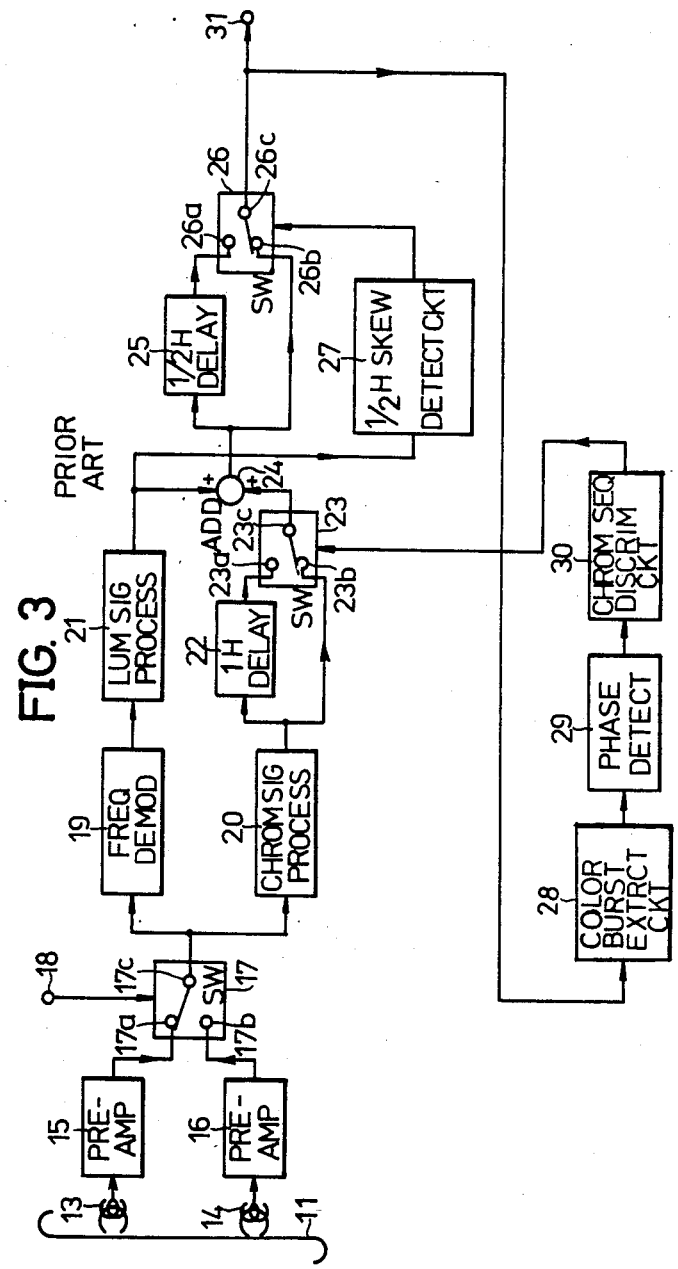
FIG. 3 is a systematic block diagram showing an example of a conventional correcting apparatus.

Accordingly, a correcting apparatus shown in FIG. 3 was conventionally used to prevent the generation of the skew phenomenon and the color disappearance. In FIG. 3, recorded signals on the tape 11 having the track pattern shown in FIG. 2A, are alternately reproduced by rotary heads 13 and 14. The reproduced signals from the rotary heads 13 and 14, are passed through respective pre-amplifiers 15 and 16. Output signals of the pre-amplifiers 15 and 16, are supplied to respective terminals 17a and 17b of a switching circuit 17. Switching pulses are supplied to the switching circuit 17 through an input terminal 18. Rotation detection pulses are obtained by detecting the rotational phase of a rotary body which is mounted with the rotary heads 13 and 14 at diametrical positions thereof, by a known means. The rotation detection pulses have a period of one field, and are used as the switching pulses. The switching circuit 17 is switched responsive to the switching pulses, so as to selectively produce through a terminal 17c thereof the output reproduced signal of one rotary head which is carrying out the reproduction. The reproduced signal from the terminal 17c, is supplied to a frequency demodulating circuit 19 and to a chrominance signal processing circuit 20. The tape 11 is recorded with a multiplexed signal in which a frequency modulated luminance signal and a frequency converted carrier chrominance signal are multiplexed. The frequency modulated luminance signal is obtained by frequency-modulating the luminance signal of the PAL system color video signal. The frequency converted carrier chrominance signal is obtained by frequency-converting the carrier chrominance signal of the PAL system color video signal into an unoccupied frequency band which is lower than the frequency band of the frequency modulated luminance signal.

Accordingly, a reproduced luminance signal is obtained from the frequency demodulating circuit 19, and is supplied to a luminance signal processing circuit 21 wherein a predetermined signal processing such as a dropout compensation and a de-emphasis is performed. On the other hand, the chrominance signal processing circuit 20 frequency-selects the frequency converted carrier chrominance signal within the reproduced signal, frequency-converts the reproduced frequency converted carrier chrominance signal back into the original frequency band, and performs a compensating process or the like as a countermeasure against crosstalk from an adjacent track. A reproduced carrier chrominance signal obtained from the chrominance signal processing circuit 20, is supplied to a 1H delay circuit 22 and to a terminal 23b of a switching circuit 23. An output delayed reproduced carrier chrominance signal of the 1H delay circuit 22, is supplied to a terminal 23a of the switching circuit 23. The switching circuit 23 selectively produces through a terminal 23c thereof the delayed reproduced carrier chrominance signal from the 1H delay circuit 22 or the undelayed reproduced carrier chrominance signal from the chrominance signal processing circuit 20, responsive to a signal from a chrominance sequence discriminating circuit 30 which will be described later on in the specification. The output signal of the switching circuit 23 is supplied to a mixing circuit 24 and is mixed with the reproduced luminance signal.

The mixing circuit 24 produces a reproduced color video signal, and supplies this reproduced color video signal to a terminal 26a of a switching circuit 26, through a 1H/2 delay circuit 25. The reproduced color video signal is also supplied directly, that is, without being delayed, to a terminal 26b of the switching circuit 26. The output reproduced luminance signal of the luminance signal processing circuit 21 is supplied to a 1H/2 skew detecting circuit 27. The 1H/2 skew detecting circuit 27 detects the parts shown in FIG. 2B where the skew of 1H/2 are generated, by detecting parts in the reproduced luminance signal where the period of the reproduced horizontal synchronizing signal is incorrect. An output detection signal of the 1H/2 skew detecting circuit 27 is supplied to the switching circuit 26 as a switching signal. In a state where the switching circuit 26 is connected to one of the terminals 26a and 26b, the switching circuit 26 is switched and connected to the other of the terminals 26a and 26b responsive to the generation of the skew of 1H/2. Hence, the periodicity of the reproduced horizontal synchronizing signal is maintained in the reproduced color video signal which is produced from a terminal 26c of the switching circuit 26. The output reproduced color video signal of the switching circuit 26 is produced through an output terminal 31. On the other hand, the output reproduced color video signal of the switching circuit 25 is also supplied to a color burst extracting circuit 28 wherein a color burst signal is extracted from the reproduced color video signal. An output color burst signal of the color burst extracting circuit 28 is supplied to a phase detecting circuit 29 wherein the phase of the color burst signal is detected. Thus, in a case where the chrominance sequence of the reproduced carrier chrominance signal is correct, a square wave which is inverted for every 1H, is obtained from the phase detecting circuit 29. However, in a case where the chrominance sequence of the reproduced carrier chrominance signal is incorrect, the periodicity of the output signal of the phase detecting circuit 29 becomes disordered. The chrominance sequence discriminating circuit 30 discriminates the disorder in the chrominance sequence, by detecting the disorder in the periodicity of the output signal of the phase detecting circuit 29. When the chrominance sequence discriminating circuit 30 discriminates that the chrominance sequence is disordered, the switching circuit 23 which is connected to one of the terminals 23a and 23b is switched and connected to the other of the terminals 23a and 23b responsive to the output signal of the chrominance sequence discriminating circuit 30. Accordingly, the reproduced color video signal in which the chrominance sequence is correct, is constantly produced through the terminal 23c of the switching circuit 23. As a result, the reproduced color video signal in which the chrominance sequence is correct and the periodicity of the reproduced horizontal synchronizing signal is maintained, is obtained through the output terminal 31 during the changed speed reproduction mode.

However, in the conventional apparatus described heretofore, a complex analog signal processing is required to control the delay time. For this reason, a circuit part for performing the analog signal processing occupies a large portion of the circuit in the apparatus, and it is difficult to make the circuit in the form of an integrated circuit (IC) and to perform the operations of the apparatus by use of a microprocessor.

Further, a rotary head for extended time mode play may be arranged extremely close to a rotary head for standard mode play. In this case, the two kinds of rotary heads are selectively used during the changed speed reproduction mode, and the noise bar which is generated when the reproducing rotary head scans over the reverse track, is greatly reduced. However, as will be described later on in the specification, a skew of 0.25H is generated in this case, and it is necessary to detect this skew of 0.25H in order to reduce the skew. But, it is difficult to stably detect the skew of 0.25H.

Next, description will be given with respect to a delay time control apparatus according to the present invention in which the problems of the conventional apparatus described heretofore have been eliminated.

Figure 4:
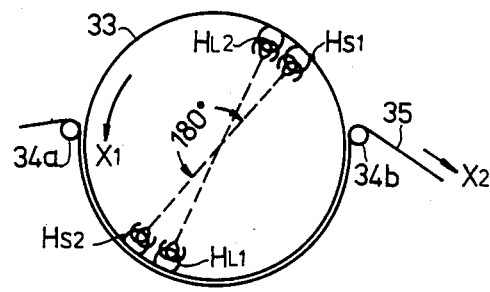
FIG. 4 is a plan view showing an embodiment of an arrangement of heads in a time delay control apparatus according to the present invention.

FIG. 4 shows an embodiment of an arrangement of heads in the apparatus according to the present invention. Rotary heads $H_{S1}$ and $H_{S2}$ for standard mode play having first head gaps, are fixedly mounted on a rotary body 33 such as a rotary drum with an angular separation of 180°. The rotary heads $H_{S1}$ and $H_{S2}$ have first head gaps of mutually different azimuth angles. The rotary body 33 is also mounted with rotary heads $H_{L1}$ and $H_{L2}$ for extended time mode play having second head gaps. The rotary head $H_{L1}$ is located at a position leading the rotary head $H_{S2}$ by a predetermined distance in the rotating direction of the rotary body 33. Similarly, the rotary head $H_{L2}$ is located at a position leading the rotary head $H_{S1}$ by a predetermined distance in the rotating direction of the rotary body 33. The rotary body 33 is constantly rotated in the direction of an arrow Xl at a rotational speed of 1500 rpm, for example. A magnetic tape 35 is wrapped around the outer peripheral surface of the rotary body 33 over an angular range which is slightly larger than 180°, under the guidance of guide poles 34a and 34b. The tape 35 is driven in the direction of an arrow X2 only during a forward reproduction mode, in a state where the tape 35 is pinched between a capstan (not shown) and a pinch roller (not shown). The tape 35 is moved at a speed such that the tape 35 moves by one track pitch during a recording mode and during the normal reproduction mode, as the rotary body 33 undergoes a one-half revolution.

Figure 5:
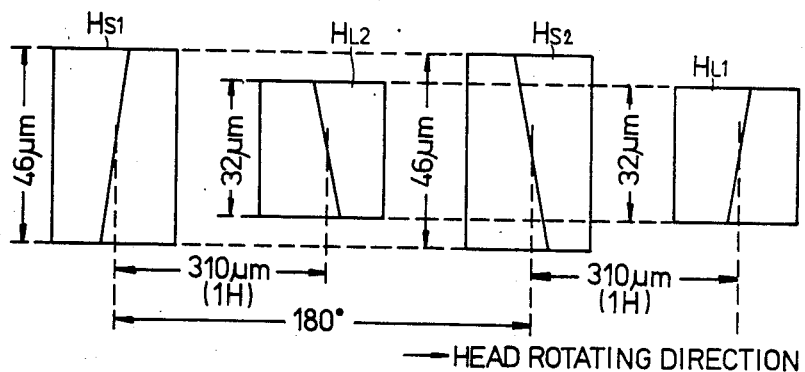
FIG. 5 shows an embodiment of mounting height positions of heads in the time delay control apparatus according to the present invention.

FIG. 5 shows an embodiment of mounting height positions of rotary heads. In FIG. 5, those parts which are the same as those corresponding parts in FIG. 4 are designated by the same reference numerals. The rotary heads $H_{S1}$ and $H_{S2}$ each have a track width of 46 $\mu$m, and the rotary heads $H_{L1}$ and $H_{L2}$ each have a track width of 32 $\mu$m. The rotary heads $H_{S1}$ and $H_{L1}$ have gaps of the same first azimuth angle, and the rotary heads $H_{S2}$ and $H_{L2}$ have gaps of the same second azimuth angle. As may be seen from FIG. 5, the first and second azimuth angles are selected such that one azimuth angle is inclined in a positive direction with respect to the track width direction of the rotary heads, and the other azimuth angle is inclined in the negative direction.

The rotary head $H_{L1}$ is separated from the rotary head $H_{S2}$ by a distance corresponding to a recording length of one horizontal scanning period (1H) on the tape 35, for example, along the rotating direction of the rotary heads. When recording and reproducing the PAL system color video signal, for example, the rotary head $H_{L1}$ leads the rotary head $H_{S2}$ by a distance of 310 $\mu$m in the rotating direction of the rotary body 33. Similarly, the rotary head $H_{L2}$ leads the rotary head $H_{S1}$ by a distance of 310 $\mu$m in the rotating direction of the rotary body 33.

Figure 6:
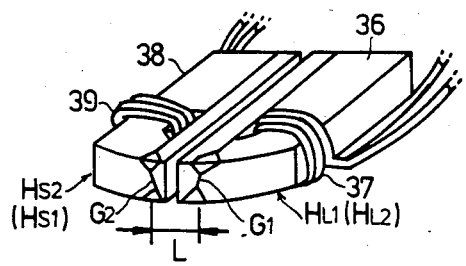
FIG. 6 is a perspective view showing a double-gap head which may be used in the time delay control apparatus according to the present invention.

The distance between the head gaps of the rotary heads $H_{L1}$ and $H_{S2}$ and the distance between the head gaps of the rotary heads $H_{L2}$ and $H_{S1}$ are respectively set to 310 $\mu$m which is an extremely small value. Hence, a double-gap head shown in FIG. 6 is normally used for the rotary heads $H_{L1}$ and $H_{S2}$ and the rotary heads $H_{L2}$ and $H_{S1}$. In FIG. 6, the rotary head $H_{L1}$ (or $H_{L2}$) for extended time mode play comprises a head winding 37 which is wound around a core 36, and has a gap $G_1$. On the other hand, the rotary head $H_{S2}$ (or $H_{S1}$) for standard mode play comprises a head winding 39 which is wound around a core 38, and has a gap $G_2$. A large portion of one end of the core 36, and a large portion of one end of the core 38, are respectively cut off. The cut off ends of the cores 36 and 38 oppose each other. A distance L between the two gaps is selected to a recording length in the order of several H. For example, the distance L is selected to a distance of 310 $\mu$m which is the recording length of 1H shown in FIG. 5.

During the standard mode recording and reproduction, the rotary heads $H_{S1}$ and $H_{S2}$ having the track width of 46 $\mu$m are used. On the other hand, during the extended time mode recording and reproduction, the rotary heads $H_{L1}$ and $H_{L2}$ having the track width of 32 $\mu$m are used. During a still picture reproduction in which the reproduction is carried out in a state where the tape is stationary, the rotary heads $H_{L2}$ and $H_{S2}$ (or $H_{L1}$ and $H_{S1}$) having the same azimuth angle are used. In the case of the still picture reproduction, a single track is alternately scanned by the rotary heads $H_{L2}$ and $H_{S2}$ (or $H_{L1}$ and $H_{S1}$), and a completely still reproduced picture is obtained. During a high-speed reproduction in which the tape is moved at a speed which is faster than the tape moving speed at the time of the recording, two rotary heads having different azimuth angles are in contact with the tape. One of these two rotary heads is selected and used during the high-speed reproduction, so that the selected rotary head produces a reproduced frequency modulated signal having a greater or larger level.

The present embodiment is applied to a helical scan type magnetic recording and reproducing apparatus or a helical scan type magnetic reproducing apparatus having the rotary heads $H_{S1}$, $H_{S2}$, $H_{L1}$ and $H_{L2}$ described heretofore. Next, description will be given with respect to a signal system of the delay time control apparatus according to the present invention.

Figure 7:
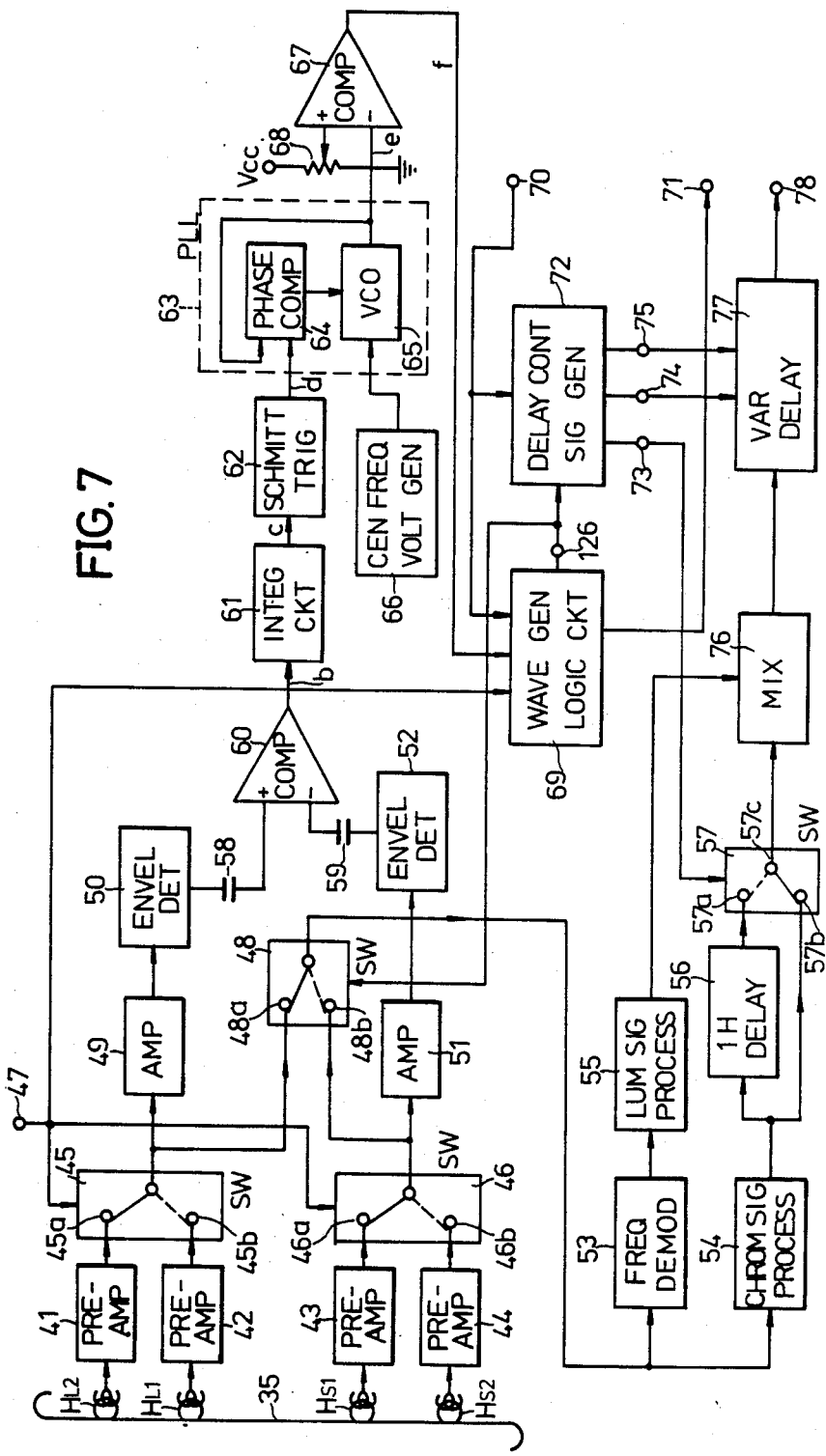
FIG. 7 is a systematic block diagram showing an embodiment of the time delay control apparatus according to the present invention.

FIG. 7 is a systematic block diagram showing an embodiment of the delay time control apparatus according to the present invention. In FIG. 7, those parts which are the same as those corresponding parts in FIGS. 4 through 6 are designated by the same reference numerals, and their description will be omitted. In FIG. 7, the rotary heads $H_{L1}$, $H_{L2}$, $H_{S1}$, and $H_{S2}$ reproduce the recorded PAL system color video signal from the tape 35 having the track pattern shown in FIG. 2A in which the H-alignment does not exist. At the time of the recording, the PAL system color video signal is separated into a luminance signal and a carrier chrominance signal. The separated luminance signal is frequency-modulated. The separated carrier chrominance signal is frequency-converted into an unoccupied frequency band lower than the frequency band of the frequency modulated luminance signal. As disclosed in the British Pat. No. 2040135 in which the applicant is the same as the assignee of the present application, the chrominance subcarrier of the carrier chrominance signal is alternately subjected to a phase shift process and is not subjected to a phase shift process, for every one track scanning period (period of one field in this case). The phase shift process shifts the phase of the chrominance subcarrier by 90° in a predetermined direction for every 1H.

Figure 8:
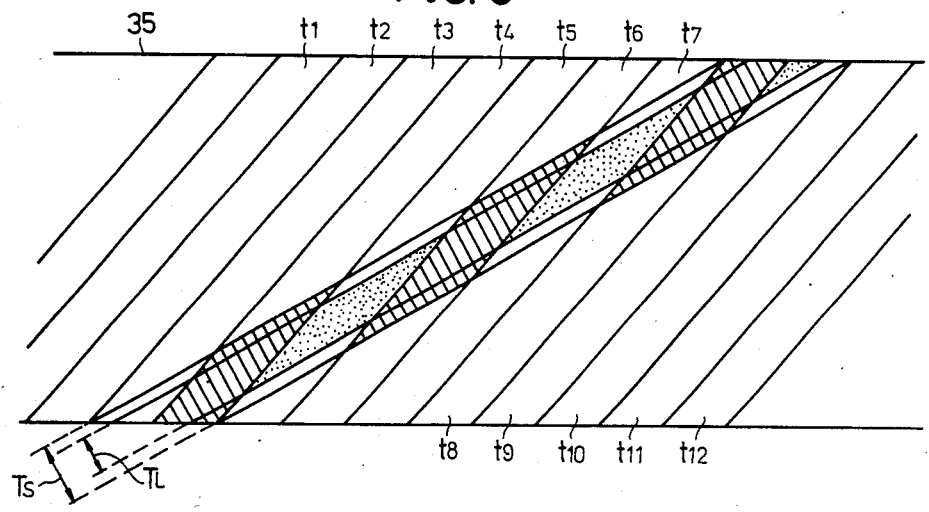
FIG. 8 shows an example of a scanning locus of head together with a track pattern.
Figure 9:
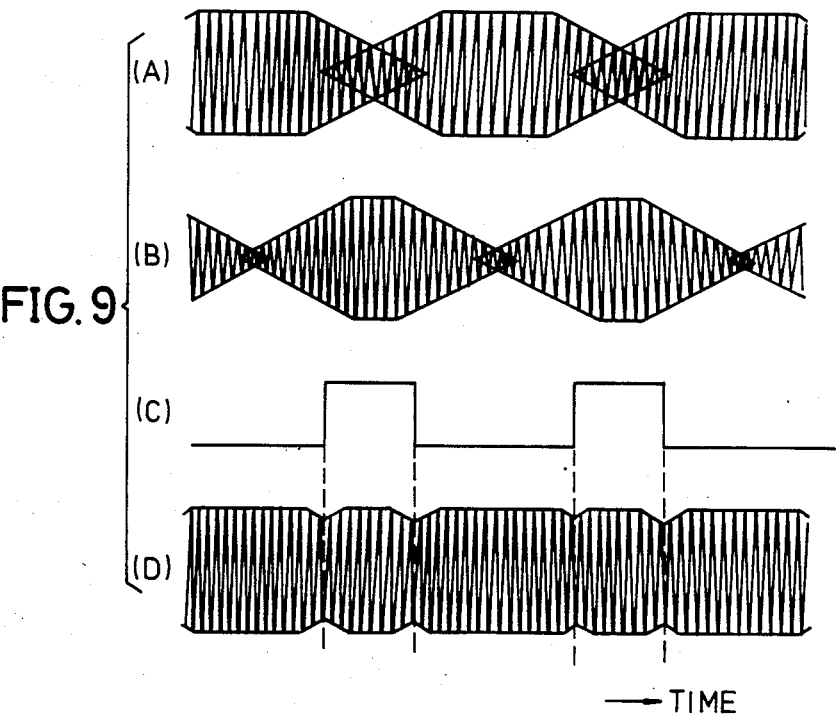
FIGS. 9(A) through 9(D) show signal waveforms for explaining the operation of an essential part of the block system shown in FIG. 7.

In a case where the tape 35 is moved at a speed which is faster than the tape moving speed at the time of the recording, the rotary heads $H_{S1}$ and $H_{L2}$ (or $H_{S2}$ and $H_{L1}$) constituting the double-gap head respectively scan over scanning loci having respective widths $T_S$ and $T_L$ shown in FIG. 8. Among the tracks $t_1$ through $t_{12}$, the rotary heads $H_{S1}$ and $H_{L2}$ reproduce recorded signals from tracks which are formed by heads having the same azimuth angle as the rotary heads $H_{S1}$ and $H_{L2}$. Accordingly, the rotary head $H_{S1}$ reproduces recorded signals from parts of the tracks $t_4$, $t_6$, and $t_8$ indicated by hatchings in FIG. 8, and the frequency modulated luminance signal within the reproduced signal from the rotary head $H_{S1}$ undergoes a level change as shown in FIG. 9(A). On the other hand, the rotary head $H_{L2}$ reproduces recorded signals from parts of the tracks $t_5$, $t_7$, and $t_9$ indicated by shades in FIG. 8, and the frequency modulated luminance signal within the reproduced signal from the rotary head $H_{L2}$ undergoes a level change as shown in FIG. 9(B).

The output reproduced signals of the rotary heads $H_{L2}$ and $H_{L1}$ are passed through respective rotary transformers (not shown) and respective pre-amplifiers 41 and 42, and are supplied to respective terminals 45a and 45b of a switching circuit 45. On the other hand, the output reproduced signals of the rotary heads $H_{S1}$ and $H_{S2}$ are passed through respective rotary transformers (not shown) and respective pre-amplifiers 43 and 44, and are supplied to respective terminals 46a and 46b of a switching circuit 46. The switching circuit 45 is switched between the terminals 45a and 45b and the switching circuit 46 is switched between the terminals 46a and 46b, for every one track scanning period (period of one field in this case), responsive to rotation detection pulses which are applied to the switching circuits 45 and 46 through a terminal 47. The rotation detection pulses are obtained by detecting the rotational phase of the rotary heads $H_{S1}$, $H_{S2}$, $H_{L1}$, and $H_{L2}$. The switching circuits 45 and 46 are controlled so that the switching circuit 46 is connected to the terminal 46a when the switching circuit 45 is connected to the terminal 45a. Accordingly, the output reproduced signal of the double-gap head which is scanning over the tape 35, is produced through common output terminals of the switching circuits 45 and 46. In other words, when the rotary heads $H_{L2}$ and $H_{S1}$ simultaneously scan over the tape 35, the output reproduced signals of the rotary heads $H_{L2}$ and $H_{S1}$ are produced through the respective common output terminals of the switching circuits 45 and 46. On the other hand, when the rotary heads $H_{L1}$ and $H_{S2}$ simultaneously scan over the tape 35, the output reproduced signals of the rotary heads $H_{L1}$ and $H_{S2}$ are produced through the respective common output terminals of the switching circuits 45 and 46.

The output reproduced signals of the rotary heads $H_{L2}$ and $H_{L1}$ for extended time mode play, are supplied to a terminal 48a of a switching circuit 48. The output reproduced signals of the rotary heads $H_{L2}$ and $H_{L1}$ are also supplied to an envelope detector 50 through an amplifier 49. On the other hand, the output reproduced signals of the rotary heads $H_{S1}$ and $H_{S2}$ for standard mode play, are supplied to a terminal 48b of the switching circuit. The output reproduced signals of the rotary heads $H_{S1}$ and $H_{S2}$ are also supplied to an envelope detector 52 through an amplifier 51. The switching circuit 48 is controlled responsive to a head selection signal shown in FIG. 9 (C) which is obtained from a waveform generating logic circuit 69 which will be described later on in the specification. The switching circuit 48 is designed to selectively produce one of the reproduced signals supplied to the terminals 48a and 48b, which has the larger level.

In other words, during a high-level period of the head selection signal shown in FIG. 9(C), the switching circuit 48 is connected to the terminal 48a so as to selectively produce the output reproduced signal of the rotary head $H_{L2}$ or $H_{L1}$ for extended time mode play. During a low-level period of the head selection signal, the switching circuit 48 is connected to the terminal 48b so as to selectively produce the output reproduced signal of the rotary head $H_{S1}$ or $H_{S2}$ for standard mode play. Hence, the reproduced frequency modulated luminance signal within the reproduced signal which is produced from the switching circuit 48, constantly has a large level as shown in FIG. 9(D). In the conventional apparatus, the level of the reproduced frequency modulated luminance signal greatly decreases during the changed speed reproduction mode when the rotary head scans over the reverse track, and the noise bar is generated at the parts where the reverse track is scanned. However, according to the present embodiment, the level of the reproduced frequency modulated luminance signal hardly decreases as shown in FIG. 9(D), and it is therefore possible to obtain a reproduced picture having no noise bar during the changed speed reproduction mode.

The reproduced signal from the switching circuit 48 is supplied to a frequency demodulating circuit 53 wherein the reproduced frequency modulated luminance signal is frequency-demodulated. The reproduced signal from the switching circuit 48 is also supplied to a chrominance signal processing circuit 54 wherein the reproduced frequency converted carrier chrominance signal is frequency-converted back into the original frequency band and is subjected to a phase shift process complementary to the phase shift process described before so as to cancel the phase shift. This complementary phase shift process is also known from the British Pat. No. 2040135 described before. A crosstalk component from the adjacent track is eliminated from the reproduced carrier chrominance signal by a comb filter within the chrominance signal processing circuit 54, and the output reproduced carrier chrominance signal of the chrominance signal processing circuit 54 is supplied to a 1H delay circuit 56 and to a terminal 57b of a switching circuit 57. An output signal of the 1H delay circuit 56 is supplied to a terminal 57a of the switching circuit 57. The 1H delay circuit 56 and the switching circuit 57 constitute a first variable delay circuit. On the other hand, the output reproduced luminance signal of the frequency demodulating circuit 53 is supplied to a luminance signal processing circuit 55 wherein the reproduced luminance signal is subjected to a predetermined signal processing such as a dropout compensation and a de-emphasis.

As shown in FIG. 2A, the H-alignment does not exist in the track pattern which is formed on the tape 35. Thus, as described before, it is necessary to subject the reproduced color video signal and the reproduced carrier chrominance signal to a delay process so that the horizontal synchronizing signals are reproduced with the correct constant period and the carrier chrominance signals are reproduced with the correct chrominance sequence in conformance with the PAL system.

A circuit part reaching a delay control signal generating circuit 72 which will be described later on in the specification, from the envelope detectors 50 and 52, generates delay control signals for performing the delay process. Next, description will be given with respect to the construction and operation of this circuit part.

For example, the envelope detectors 50 and 52 are designed to detect the positive envelope of the reproduced frequency modulated luminance signal within the respective reproduced signals from the amplifiers 49 and 51. The envelope detectors 50 and 52 produce signals having levels in accordance with the detected positive envelopes. The output signal of the envelope detector 50 is supplied to a comparator 60 through a capacitor 58, and the output signal of the envelope detector 52 is supplied to the comparator 60 through a capacitor 59. The capacitors 58 and 59 are provided so that a level deviation component in the reproduced signal which is obtained as the rotary head scans over the reverse track, is emphasized compared to a level deviation component which occurs at a low frequency due to inconsistencies in the reproducing sensitivities of the rotary heads or the like.

Figure 10:
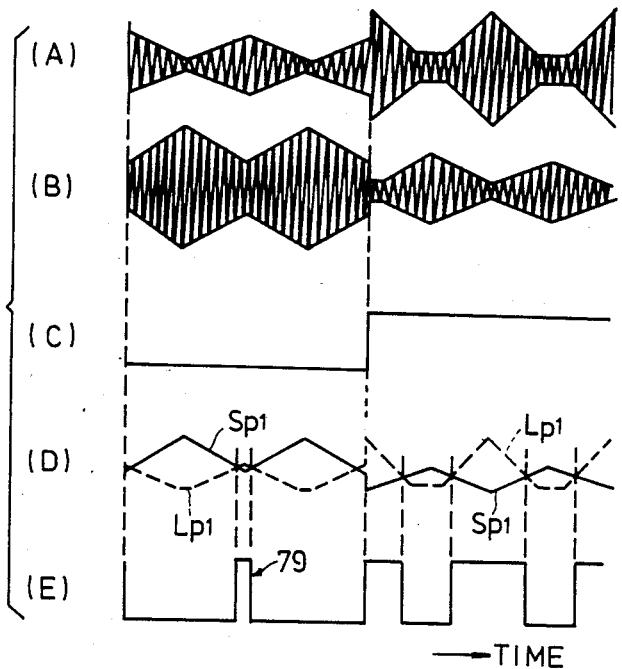
FIGS. 10(A) through 10(E) show signal waveforms for explaining an output signal of a comparator in the block system shown in FIG. 7 in a case where a high-pass filter is not provided in an input stage of the comparator.

In other words, in a case where the envelope detectors 50 and 52 detect respective reproduced frequency modulated luminance signals shown in FIGS. 10(A) and 10(B) and the rotation detection pulses shown in FIG. 10(C) are obtained through the terminal 47, the envelope detector 50 supplies a detection signal indicated by a phantom line $LP_1$ in FIG. 10(D) to the comparator 60 and the envelope detector 52 supplies a detection signal indicated by a solid line $SP_1$ in FIG. 10(D) to the comparator 60 when the capacitors 58 and 59 are not provided. It will be assumed that the comparator 60 is designed to produce a high-level signal when the level of the detection signal $LP_1$ is larger than the level of the detection signal $SP_1$, and in this case, the comparator 60 produces a signal shown in FIG. 10(E).

Figure 11:
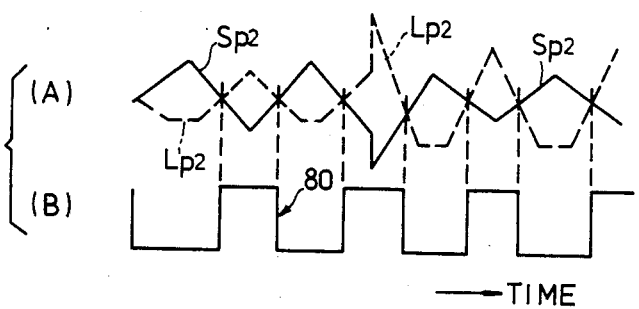
FIGS. 11(A) and 11(B) show signal waveforms for explaining the output signal of the comparator in the block system shown in FIG. 7.

However, as shown in FIG. 10(E), the output signal of the comparator 60 has a part 79 where the pulse width is extremely narrow. Hence, the selection of the rotary heads cannot be made in a stable manner by use of the signal shown in FIG. 10(E) which has the extremely narrow part 79. Thus, the capacitors 58 and 59 are provided for the reasons described before so as to obtain a highpass filter effect. When the output signals of the envelope detectors 50 and 52 are passed through the respective capacitors 58 and 59, detection signals indicated by a phantom line $LP_2$ and a solid line $SP_2$ in FIG. 11(A) are supplied to the comparator 60. As may be seen from FIG. 11(A), the high-frequency components of the detection signals are relatively emphasized compared to the low-frequency components. As a result, the output signal of the comparator 60 becomes as shown in FIG. 11(B) when the capacitors 58 and 59 are provided. The extremely narrow part 79 in the signal shown in FIG. 10(E) is widened to a part 80 in the signal shown in FIG. 11(B), and for this reason, it is possible to select the rotary heads in a stable manner.

Figure 12:
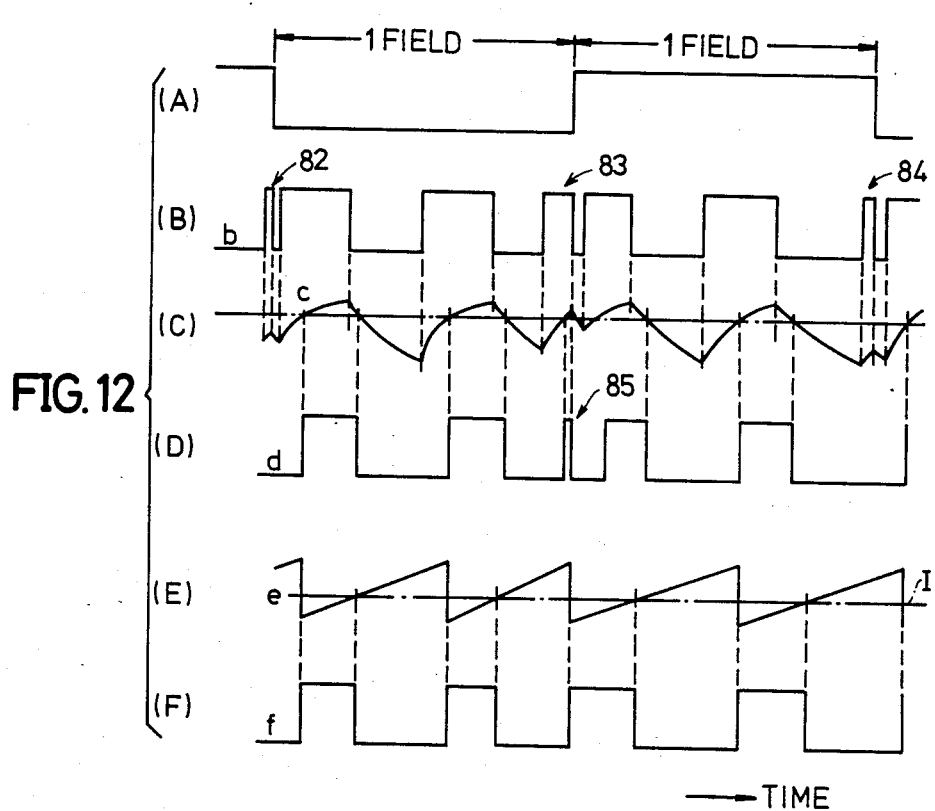
FIGS. 12(A) through 12(F) show signal waveforms for explaining the operation of another essential part of the block system shown in FIG. 7.

In a case where the movement of the tape 35 is stable and the contact state between the tape 35 and the rotary heads is constantly satisfactory, the output signal of the comparator 60 shown in FIG. 11(B) is supplied to the switching circuit 48 as a head selection signal. The output signal of the comparator 60 may also be used to produce control signals for obtaining the required delay times. However, in actual practice, the contact state between the tape 35 and the rotary heads is not constantly satisfactory. The contact state becomes unstable especially at places where the rotary head begins to make sliding contact with the tape 35 and where the rotary head begins to separate from the tape 35, and the level of the reproduced signal becomes unstable at such places. Thus, an erroneous head selection may be made because of this unstable level of the reproduced signal. Accordingly, in the present embodiment, the apparatus has a circuit part for preventing such erroneous head selection, and description will now be given with respect to the construction and operation of this circuit part by referring to FIGS. 12(A) through 12(F). FIG. 12(A) shows the rotation detection pulses which are applied to the terminal 47, and these rotation detection pulses have the same signal waveform as the rotation detection pulses shown in FIG. 10(C). In this case, the output signal b of the comparator 60 becomes as shown in FIG. 12(B). As described before, the contact state between the tape 35 and the rotary heads becomes unstable at places where the rotary head begins to make sliding contact with the tape 35 and where the rotary head begins to separate from the tape 35. Thus, as shown in FIG. 12(B), the output signal b of the comparator 60 includes pulse parts 82, 83, and 84 in vicinities of the rising and falling edges of the rotation detection pulses, where the pulse width is narrower than a predetermined value.

The output signal b of the comparator 60, including the pulse parts 82, 83, and 84, is delayed in an integrating circuit 61. The integrating circuit 61 produces a signal c shown in FIG. 12(C) wherein the extremely narrow pulse parts 82 and 84 are compensated. The output signal c of the integrating circuit 61 is supplied to a Schmitt trigger circuit 62 wherein the signal is converted into a square wave signal d shown in FIG. 12(D). As shown in FIG. 12(D), the square wave signal d includes a pulse part 85 corresponding to the relatively wide pulse part 83 in the signal b.

The output square wave signal d of the Schmitt trigger circuit 62 is supplied to a phase comparator 64 within a phase locked loop (PLL) 63. As is well known, the PLL 63 variably controls the output oscillation frequency of a voltage controlled oscillator (VCO) 65 by an output phase error voltage of the phase comparator 64, and is designed to compare the phase of the output signal of the VCO 65 and the phase of the square wave signal d in the phase comparator 64. The center frequency of the VCO 65 is set in accordance with the reproducing speed, responsive to an output voltage of a center frequency setting voltage generating circuit 66 which will be described later on in the specification. The output oscillation frequency of the VCO 65 is controlled responsive to the output phase error voltage of the phase comparator 64, so that the phase of the output signal of the VCO 65 and the phase of the square wave signal d which includes the pulse part 85 are respectively maintained constant. The time constant of the PLL 63 is set to a sufficiently low frequency, and the output oscillation frequency of the VCO 65 is prohibited from undergoing a quick change. Hence, the PLL 63 will not follow the pulse part 85 in the square wave signal d shown in FIG. 12(D). The output oscillation frequency of the VCO 65 undergoes a slight change and the phase deviates slightly responsive to the pulse part 85 in the square wave signal d which is supplied to the PLL 63, however, the pulses indicative of the periods in which the rotary head $H_{L2}$ or $H_{S1}$ scans over the track make up a large part of the square wave signal d and the pulse part 85 occurs rarely compared to these pulses. Hence, the existence of the pulse part 85 does not give rise to problems. The VCO 65 produces a signal e shown in FIG. 12(E).

Next, description will be given with respect to the setting of the center frequency of the VCO 65. In a case where the tape 35 which is recorded with the PAL system color video signal having the field frequency of 50 Hz is played in an N-times speed reproduction mode in which the tape 35 is moved at a speed which is N times the tape moving speed at the time of the recording, the center frequency $f_c$ of the VCO 65 is set in relation to the number of tracks which are scanned by the rotary head by use of the following equation (1), where N is a positive integer at the time of a high-speed forward reproduction mode and is a negative integer at the time of a high-speed reverse reproduction mode.

$$f_c = 25(N-1) \text{ (Hz)} \tag{1}$$

Figure 13:
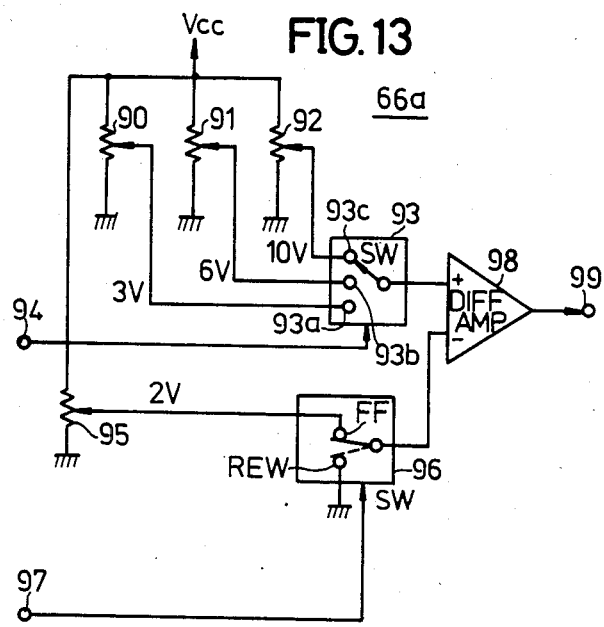
FIG. 13 is a circuit diagram showing an embodiment of a voltage generating circuit for generating a center frequency setting voltage in the block system shown in FIG. 7.

FIG. 13 shows a first embodiment of the center frequency setting voltage generating circuit 66. A center frequency setting voltage generating circuit 66a is designed to work with the reproducing speeds of twice, five times, and nine times, and selectively produces a center frequency setting voltage depending on whether the tape moving direction for the set reproducing speed is the same as (forward) or in reverse to the tape moving direction at the time of the recording. In FIG. 13, variable resistors 90, 91, and 92 are provided to generate voltages 3v, 6v, and 10v, and the three voltages are supplied to respective terminals 93a, 93b, and 93c of a switching circuit 93. A voltage v is equal to the center frequency setting voltage for setting the center frequency of the VCO 65 to 35 Hz. The switching circuit 93 is connected to the terminal 93a at the time of a two-times speed reproduction mode, the terminal 93b at the time of a five-times speed reproduction mode, and the terminal 93c at the time of a nine-times speed reproduction mode. The switching circuit 93 selectively produces one of the voltages 3v, 6v, and 10v and supplies the selectively produced voltage to a non-inverting input terminal of a differential amplifier 98.

On the other hand, a variable resistor 95 divides a voltage Vcc from the same power source to which the variable resistors 90 through 92 are connected, so as to obtain a voltage 2v. This voltage 2v is supplied to a terminal FF of a switching circuit 96. The switching circuit 96 is designed to selectively produce one of the voltages supplied to terminals FF and REW thereof, responsive to a reproducing direction setting signal from an input terminal 97. The switching circuit 96 selectively produces the voltage 2v supplied to the terminal FF when the reproducing direction is forward, and selectively produces the voltage 0v supplied to the terminal REW when the reproducing direction is reverse. The differential amplifier 98 produces a voltage responsive to a difference between the output signal of the switching circuit 93 received through the non-inverting input terminal and the output voltage of the switching circuit 96 received through an inverting input terminal. The output signal of the differential amplifier 98 is produced through an output terminal 99 as the center frequency setting voltage. The relationships of the input voltages of the differential amplifier 98, the output voltage of the differential amplifier 98, and the center frequency of the VCO 65, are shown in the following table 1 for each reproducing speed and reproducing direction.

TABLE 1

| Reproducing direction | Reproducing direction | Non-inverting input | Inverting input | Output voltage | Center frequency |
|---|---|---|---|---|---|
| Forward | Two-times | 3v | 2v | v | 25 Hz |
| | Five-times | 6v | 2v | 4v | 100 Hz |
| | Nine-times | 10v | 2v | 8v | 200 Hz |
| Reverse | Two-times | 3v | 0v | 3v | 75 Hz |
| | Five-times | 6v | 0v | 6v | 150 Hz |
| | Nine-times | 10v | 0v | 10v | 250 Hz |

Therefore, according to the present embodiment, even with respect to the same reproducing speed, the differential amplifier 98 performs a processing which differs by 50 Hz depending on the reproducing direction, as may be seen from the equation (1). In addition, because the center frequency setting voltage is obtained by performing an operation between the two voltages which are determined by the reproducing speed setting signal and the reproducing direction setting signal, the present embodiment employs a small number of voltage sources, namely, one.

Figure 14:
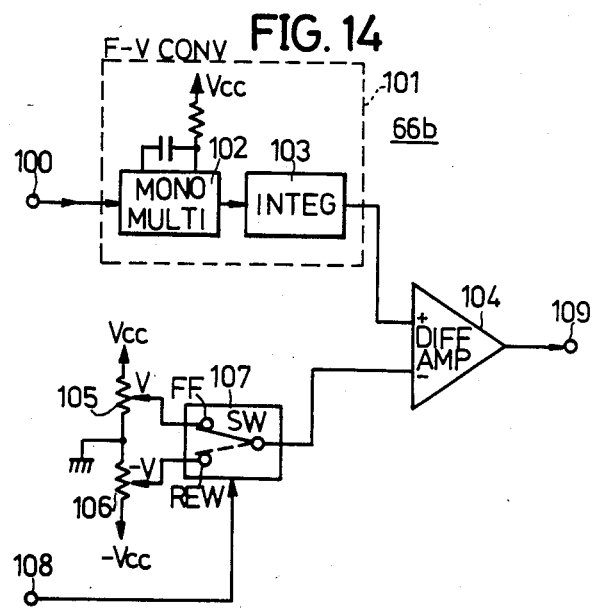
FIG. 14 is a systematic circuit diagram showing another embodiment of the voltage generating circuit in the block system shown in FIG. 7.

Next, description will be given with respect to another embodiment of the center frequency setting voltage generating circuit 66 by referring to FIG. 14. In FIG. 14, capstan rotation detection pulses having a repetition frequency responsive to the rotational speed of the capstan, are applied to an input terminal 100 of a center frequency setting voltage generating circuit 66b. The capstan rotation detection pulses are supplied to a monostable multivibrator 102 within a frequency-to-voltage (F-V) converter 101. That is, this embodiment is not applied to an apparatus in which the capstan is disengaged from the pinch roller and the tape is moved solely by the rotational force of a reel during the high-speed reproduction mode, but is applied to an apparatus in which the engagement of the capstan and the pinch roller is maintained and the tape is moved at a high speed by rotating the capstan at a rotational speed which is faster than the rotational speed of the capstan at the time of the recording during the high-speed reproduction mode.

Figure 15:
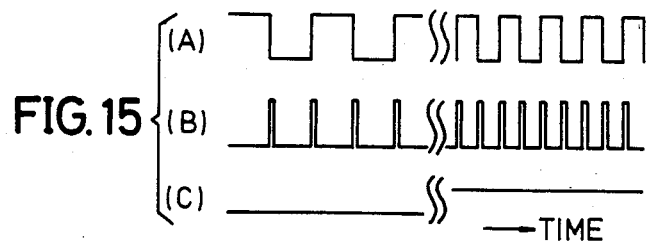
FIGS. 15(A) through 15(C) show signal waveforms for explaining the operation of the circuit system shown in FIG. 14.

The monostable multivibrator 102 and an integrating circuit 103 constitute the F-V converter 101. When the capstan rotation detection pulses shown in FIG. 15(A) are supplied to the monostable multivibrator 102, the monostable multivibrator 102 produces a pulse signal shown in FIG. 15(B) having pulses with a constant pulse width. The output signal of the monostable multivibrator 102 is supplied to the integrating circuit 103. Accordingly, a voltage shown in FIG. 15(C) which is proportional to the repetition frequency of the capstan rotation detection pulses shown in FIG. 15(A), is produced from the integrating circuit 103 and is supplied to a non-inverting input terminal of a differential amplifier 104.

On the other hand, D.C. voltages v and −v which are respectively obtained from variable resistors 105 and 106, are applied to respective terminals FF and REW of a switching circuit 107. The switching circuit 107 is designed to switch and connect to the terminal FF at the time of the high-speed forward reproduction mode and connect to the terminal REW at the time of the high-speed reverse reproduction mode, responsive to a reproducing direction setting signal obtained through an input terminal 108. An output voltage of the switching circuit 107 is supplied to an inverting input terminal of the differential amplifier 104. The output voltage of the switching circuit 107 is used to change the center frequency by 50 Hz depending on the reproducing direction even when the reproducing speed is the same, as in the case described before.

According to this embodiment, it is possible to produce through an output terminal 109 a center frequency setting voltage which constantly follows the tape moving speed. Thus, it is possible to set the center frequency of the VCO 65 in correspondence with an arbitrary reproducing speed.

Returning now to the description of the circuit shown in FIG. 7, the output signal e of the VCO 65 is applied to a comparator 67. The comparator 67 compares the level of the signal e with a predetermined reference voltage which is obtained from a variable resistor 68. This predetermined reference voltage is indicated by a one-dot chain line in FIG. 12(E). The comparator 67 produces a signal which assumes a low level when the saw-tooth waveform of the signal e is greater than the predetermined reference voltage and assumes a high level when the saw-tooth waveform of the signal e is smaller than the predetermined reference voltage. Hence, a signal f shown in FIG. 12(F) is produced from the comparator 67. This signal f passes through the waveform generating logic circuit 69 unchanged during the high-speed reproduction mode, and is supplied to the switching circuit 48 as a head selection signal which is the same as the head selection signal shown in FIG. 9(C).

The reproduced signal from the rotary head $H_{L1}$ or $H_{L2}$ for extended time mode play, is selectively produced during a high-level period of the signal f. On the other hand, the reproduced signal from the rotary head $H_{S1}$ or $H_{S2}$ for standard mode play, is selectively produced during a low-level period of the signal f. Thus, the predetermined reference voltage from the variable resistor 68 is selected to a value so that the low-level period of the signal f is longer than the high-level period of the signal f. As a result, the period in which the reproduced signal is obtained from the rotary head $H_{S1}$ or $H_{S2}$, becomes longer than the period in which the reproduced signal is obtained from the rotary head $H_{L1}$ or $H_{L2}$. Therefore, it is possible to prevent the picture quality from becoming deteriorated at parts where the switching of the rotary heads takes place.

The waveform generating logic circuit 69 generates the head selection signal. This waveform generating logic circuit 69 receives the output signal f of the comparator 67, mode signals from an input terminal 70 indicative of an operation mode of the apparatus, and the rotation detection pulses from the terminal 47. The waveform generating logic circuit 69 generates a head selection signal for selecting the rotary heads $H_{S1}$ and $H_{S2}$ during the standard mode, and generates a head selection signal for selecting the rotary heads $H_{L1}$ and $H_{L2}$ during the extended time mode. Further, during the high-speed reproduction mode, the waveform generating logic circuit 69 passes the signal f unchanged, as the head selection signal. The waveform generating logic circuit 69 also generates a reference signal for cancelling the phase shift performed with respect to the frequency converted carrier chrominance signal in the chrominance signal processing circuit 54, and this reference signal is obtained through an output terminal 71. In other words, during the high-speed reproduction mode, the frequency converted carrier chrominance signal which is subjected to the phase shift and the frequency converted carrier chrominance signal which is not subjected to the phase shift, are alternately reproduced with a period which is shorter than the period of the rotation detection pulses from the terminal 47, depending on the head selection which is made. For this reason, it is necessary to produce the reference signal (indicative of the rotary head from which the reproduced signal is obtained) in order to obtain the reproduced carrier chrominance signal in which the phase shift is cancelled depending on the head selection which is made.

Figure 16:
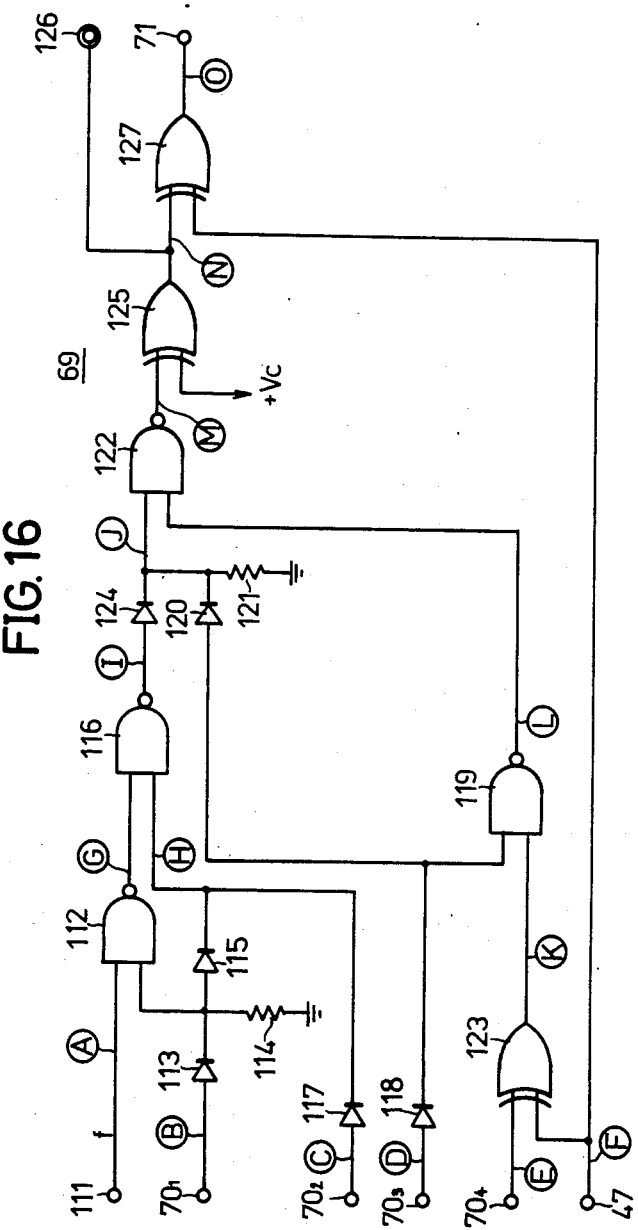
FIG. 16 is a concrete circuit diagram showing an embodiment of a waveform generating logic circuit in the block system shown in FIG. 7.

FIG. 16 shows a concrete circuit of an embodiment of the waveform generating logic circuit 69. The output signal (the signal f at the time of the high-speed reproduction mode) of the comparator 67 is applied to an input terminal 111, and is supplied to one input terminal of a 2-input NAND circuit 112. Input terminals $70_1$ through $70_4$ correspond to the input terminal 70 shown in FIG. 7. A high-speed reproduction mode signal which assumed a high level only during the high-speed reproduction mode, is applied to the input terminal $70_1$. A standard mode signal which assumes a high level only during the standard mode, is applied to the input terminal $70_2$. In addition, a still reproduction mode signal which assumes a high level only during the still picture reproduction mode, is applied to the input terminal $70_3$. An extended time mode signal which assumes a high level only during the extended time mode, is applied to the input terminal $70_4$. The high-speed reproduction mode signal is passed through a circuit which comprises a diode 113 and a resistor 114, and is supplied to the other input terminal of the NAND circuit 112. The high-speed reproduction mode signal is also passed through a diode 115, and is supplied to one input terminal of a 2-input NAND circuit 116.

The standard mode signal is passed through a diode 117, and is supplied to the other input terminal of the NAND circuit 116. Moreover, the still picture reproduction mode signal is passed through a diode 118, and is supplied to one input terminal of a 2-input NAND circuit 119. The still picture reproduction mode signal is also passed through a circuit which comprises a diode 120 and a resistor 121, and is supplied to one input terminal of a 2-input NAND circuit 122. In addition, the extended time mode signal is passed through a 2-input exclusive-OR circuit 123 together with the rotation detection pulses from the input terminal 47, and is supplied to the other input terminal of the NAND circuit 119.

Hence, a signal waveform obtained at the input terminal 111 (point Ⓐ) becomes as shown in FIG. 17(A), and signal waveforms obtained at the input terminals $70_1$, $70_2$, $70_3$, and $70_4$ (points Ⓑ, Ⓒ, Ⓓ, and Ⓔ) respectively become as shown in FIGS. 17(B), 17(C), 17(D), and 17(E). In FIGS. 17(A) through 17(E) and FIGS. 17(F) through 17(O) which will be described hereinafter, periods $T_{NS}$, $T_{SES}$, and $T_{STS}$ respectively represent a normal reproduction period, a high-speed reproduction period, and a still picture reproduction period. Further, a normal reproduction period during the extended time mode is represented by $T_{NL}$, a high-speed reproduction period during the extended time mode by $T_{SEL}$, and a still picture reproduction period during the extended time mode by $T_{STL}$. The periods $T_{NS}$, $T_{SES}$, $T_{STS}$, $T_{NL}$, $T_{SEL}$, and $T_{STL}$ are each shown as being a period of one frame in FIGS. 17(A) through 17(O) for convenience' sake.

Figure 17:
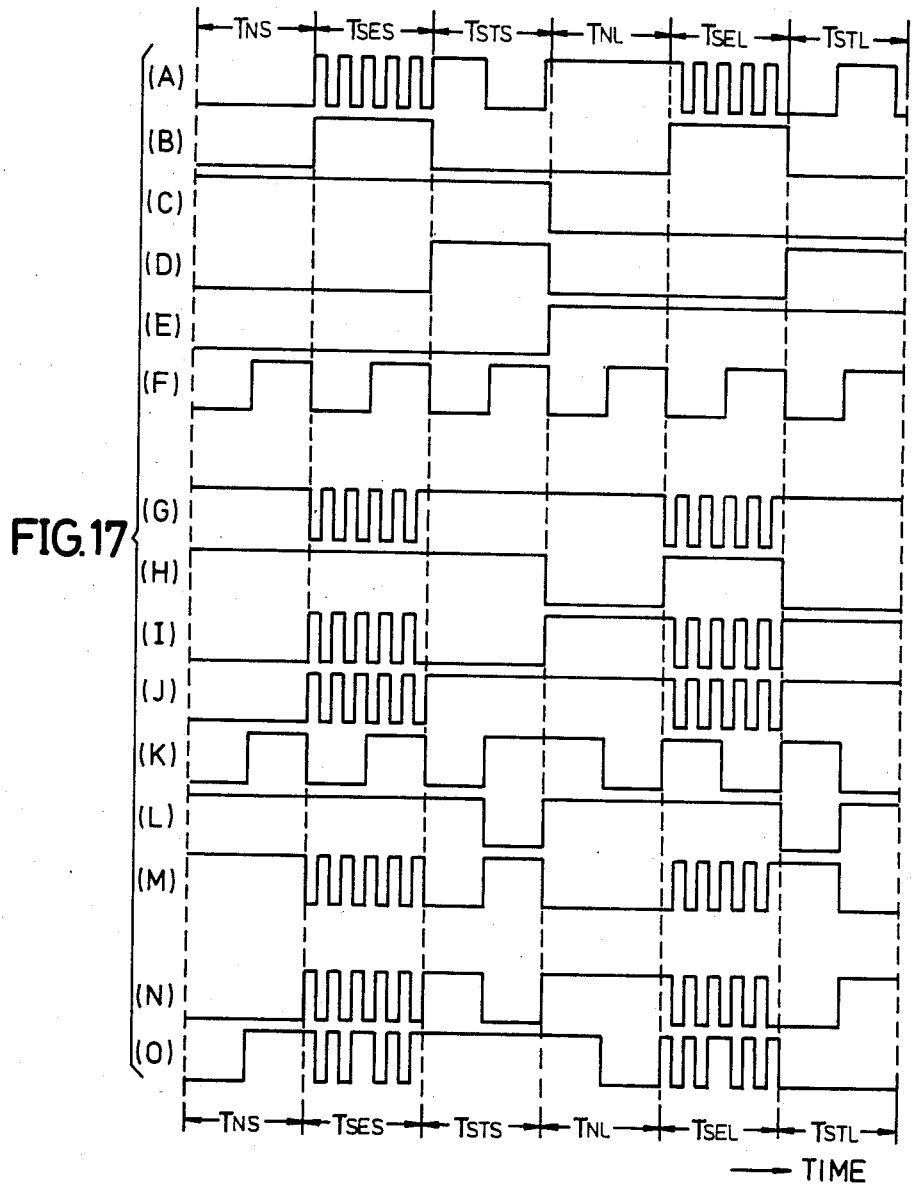

FIG. 17(F) shows the rotation detection pulses at the input terminal 47 (a point Ⓕ) in FIG. 16. FIGS. 17(G), 17(H), 17(I), and 17(K) respectively show signal waveforms at points Ⓖ, Ⓗ, Ⓘ, and Ⓚ in FIG. 16. An output signal of the NAND circuit 116 is passed through a diode 124, and a logical product is taken between the output signal of the diode 124 and the still picture reproduction mode signal from the input terminal $70_3$. As a result, the signal waveform at a connection point Ⓙ between the diodes 120 and 124 becomes as shown in FIG. 17(J). A signal shown in FIG. 17(L) at an output point Ⓛ of the NAND circuit 119, and the signal shown in FIG. 17(J) are supplied to the NAND circuit 122 and are converted into a signal shown in FIG. 17 (M). The signal shown in FIG. 17(M) is supplied to one input terminal Ⓜ of a 2-input exclusive-OR circuit 125. A high-level signal is constantly supplied to the other input terminal of the exclusive-OR circuit 125. Thus, the output signal of the NAND circuit 122 is subjected to a phase inversion and is produced from the exclusive-OR circuit 125. The output signal of the exclusive-OR circuit 125 produced through an output terminal 126, and is also supplied to one input terminal of a 2-input exclusive-OR circuit 127. Accordingly, the signal waveform at an output point Ⓝ of the exclusive-OR circuit 125 becomes as shown in FIG. 17(N), and has an inverted phase with respect to the signal shown in FIG. 17(M). The output signal of the exclusive-OR circuit 125 is produced through the output terminal 126 as the head selection signal. The rotation detection pulses from the input terminal 47 are supplied to the other input terminal of the exclusive-OR circuit 127, and the signal waveform at an output point Ⓞ of the exclusive-OR circuit 127 becomes as shown in FIG. 17(O). The output signal of the exclusive-OR circuit 127 is produced through the output terminal 71.

The head selection signal which is obtained through the output terminal 126 of the waveform generating logic circuit 69, is supplied to the switching circuit 48 and the delay control signal generating circuit 72 shown in FIG. 7. The delay control signal generating circuit 72 receives the head selection signal and the mode signals from the input terminal 70, and supplies a switching pulse to the switching circuit 57 through an output terminal 73 so that the switching circuit 57 constantly produces a reproduced carrier chrominance signal having the correct chrominance sequence. The delay control signal generating circuit 72 also produces delay control signals through output terminals 74 and 75 thereof, and supplies these delay control signals to a variable delay circuit 77 so as to variably control the delay time of the variable delay circuit 77. Basically, the delay control signal generating circuit 72 is a count-down circuit.

Figure 18:
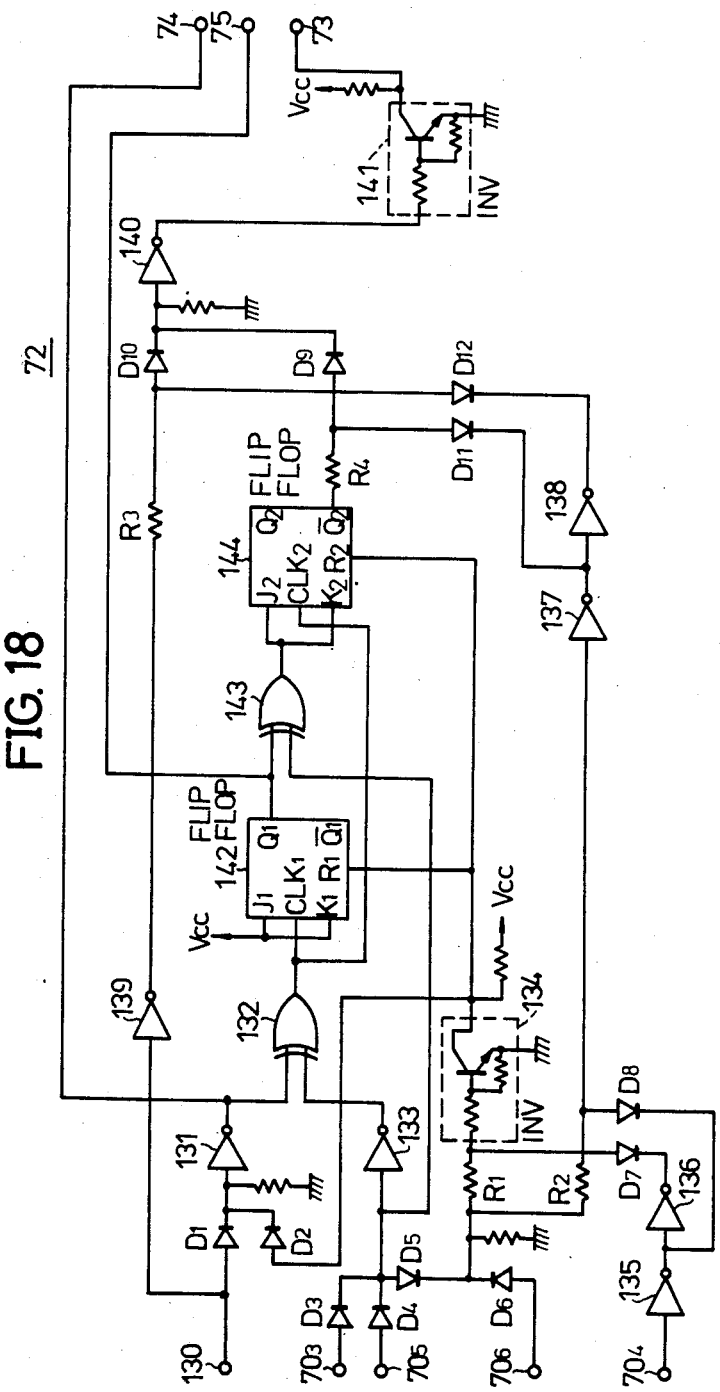
FIG. 18 is a concrete circuit diagram showing an embodiment of a delay control signal generating circuit in the block system shown in FIG. 7.

FIG. 18 shows a concrete circuit of an embodiment of the delay control signal generating circuit 72. In FIG. 18, those parts which are the same as those corresponding parts in FIGS. 7 and 16 are designated by the same reference numerals. The head selection signal described before is applied to an input terminal 130. The still picture reproduction mode signal is applied to the input terminal $70_3$, and a high-speed reverse reproduction mode signal which assumes a high level at the time of the high-speed reverse reproduction mode is applied to an input terminal $70_5$. Further, a high-speed forward reproduction mode signal which assumes a high level at the time of a high-speed forward reproduction mode is applied to an input terminal $70_6$, and an extended time mode signal which assumes a high level at the time of the extended time mode is applied to the input terminal $70_4$. In other words, the input terminals $70_3$ through $70_6$ shown in FIG. 18 correspond to the input terminal 70 shown in FIG. 7.

First, description will be given with respect to a case where the tape 35 which is recorded in the extended time mode and has the track pattern shown in FIG. 2A, is to be played in the high-speed reverse reproduction mode. The signal waveform at each part of the circuit shown in FIG. 18 during the high-speed reverse reproduction mode, is shown in FIGS. 19(A) through 19(G) within a range $T_1$. The head selection signal is applied to the input terminal 130, and the head selection signal is supplied to an inverter 131 through a diode $D_1$. The phase of the head selection signal is inverted in the inverter 131, and the inverter 131 produces a signal shown in FIG. 19(A) within the range $T_1$. The output signal of the inverter 131 is produced through the output terminal 74 as a control signal, and is also supplied to one input terminal of a 2-input exclusive-OR circuit 132. The high-level high-speed reverse reproduction mode signal from the input terminal $70_5$, is passed through diodes $D_4$ and $D_5$ and a resistor $R_1$, and is supplied to an inverter 134. The inverter 134 produces a low-level signal shown in FIG. 19(B) within the range $T_1$, and supplies this low-level signal to respective reset terminals of J-K flip-flops 142 and 144. The high-speed reverse reproduction mode signal is also passed through the diode $D_4$ and is supplied to an inverter 133 as a high-level signal shown in FIG. 19(C) within the range $T_1$. The inverter 133 produces a low-level signal, and supplies this low-level signal to the other input terminal of the exclusive-OR circuit 132.

Figure 19:
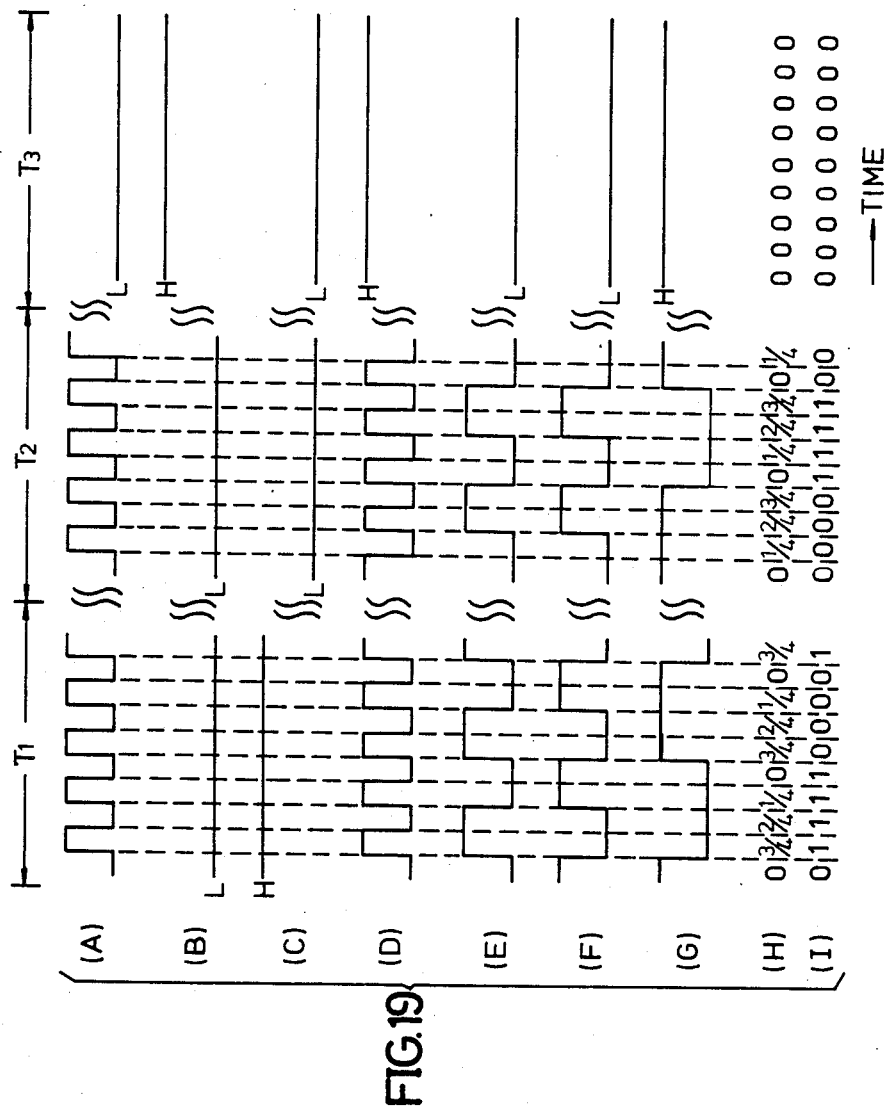
FIGS. 19(A) through 19(I) show signal waveforms at each part of the circuit shown in FIG. 18 at the time of a high-speed reverse reproduction mode, a high-speed forward reproduction mode, and a normal reproduction mode, and delay times which are to be added to the reproduced signal.

Accordingly, a pulse signal shown in FIG. 19(D) within the range $T_1$, which is in phase with the output signal of the inverter 131, is obtained from the exclusive-OR circuit 132. The output pulse signal of the exclusive-OR circuit 132 is supplied to respective clock input terminals of the flip-flops 142 and 144. A high-level signal (voltage) is applied to a J-input terminal and a K-input terminal of the flip-flop 142. Thus, a pulse signal shown in FIG. 19 (E) within the range $T_1$, which reverses state responsive to every rising edge of the pulse signal applied to the clock input terminal of the flip-flop 142, is produced through a $Q_1$-output terminal of the flip-flop 142. The output pulse of the flip-flop 142 is produced through the output terminal 75 as a control signal, and is also supplied to a 2-input exclusive-OR circuit 143 together with the high-level high-speed reverse reproduction mode signal shown in FIG. 19(C) within the range $T_1$. For this reason, the exclusive-OR circuit 143 produces a pulse signal shown in FIG. 19(F) within the range $T_1$, which has an inverted phase with respect to the output pulse signal of the flip-flop 142 shown in FIG. 19(E) within the range $T_1$. The output pulse signal of the exclusive-OR circuit 143 is supplied to a J-input terminal and a K-input terminal of the flip-flop 144. Consequently, a pulse signal shown in FIG. 19(G) within the range $T_1$ is produced through a $Q_2$-output terminal of the flip-flop 144.

On the other hand, the high-level extended time mode signal from the input terminal $70_4$ is passed through inverters 135 and 136, and is applied to a cathode of a diode $D_7$ so as to turn the diode $D_7$ OFF. In addition, a low-level output signal of the inverter 135 biases a diode $D_8$ in the forward direction. Accordingly, the high-level output signal of the diode $D_5$ shown in FIG. 19(C) within the range $T_1$, is applied to the inverter 134 through the resistor $R_1$ as described before, but the signal level at a connection point between a resistor $R_2$ and an anode of the diode $D_8$ is low because the diode $D_8$ is turned ON. Thus, the output signal of an inverter 137 assumes a high level, and an output signal of an inverter 138 assumes a low level. Consequently, a diode $D_{11}$ is turned OFF, and a diode $D_{12}$ is turned ON. When the diode $D_{12}$ is turned ON, the transmission of the pulse signal shown in FIG. 19(A) within the range $T_1$, which is obtained through the input terminal 130, an inverter 139, and a resistor $R_3$, is blocked. Hence, the output signal of the flip-flop 144 is passed through a resistor R₄ and a diode D₉, and the pulse signal shown in FIG. 19(G) within the range T₁ is obtained from a connection point between cathodes of the diodes D₉ and D₁₀. The pulse signal from the connection point between the cathodes of the diodes D₉ and D₁₀ is passed through inverters 140 and 141, and is produced through the output terminal 73 as a control signal.

The control signals produced through the output terminals 74 and 75, are respectively supplied to the variable delay circuit 77 shown in FIG. 7. The delay time in the variable delay circuit 77 is controlled according to a combination of high and low levels (logic levels "1" and "0") of the control signals which are obtained from the output terminals 74 and 75. The relationships of the levels of the control signals from the output terminals 74 and 75 and the delay time in the variable delay circuit 77, are shown in the following table 2.

TABLE 2

| Output terminal 74 | Output terminal 75 | Delay time |
|---|---|---|
| 0 | 0 | 0 H |
| 0 | 1 | 0.25 H |
| 1 | 0 | 0.50 H |
| 1 | 1 | 0.75 H |

In FIG. 7, a mixing circuit 76 mixes the reproduced luminance signal and the reproduced carrier chrominance signal, and produces a reproduced color video signal. Accordingly, the delay time of the variable delay circuit 77 which delays the output reproduced color video signal of the mixing circuit 76, becomes as shown in FIG. 19(H) within the range T₁ during the high-speed reverse reproduction mode. In FIGS. 19(H) and 19(I), the unit of the numerical values is one horizontal scanning period, that is, H.

On the other hand, the control signal from the output terminal 73 is applied to the switching circuit 57 shown in FIG. 7 as a switching signal. The switching circuit 57 is connected to the terminal 57a when the switching signal assumes a low level, and is connected to the terminal 57b when the switching signal assumes a high level. Hence, the output reproduced carrier chrominance signal of the chrominance signal processing circuit 54 is delayed by a delay time shown in FIG. 19(I) within the range T₁, and the chrominance sequence is maintained to the correct chrominance sequence which is in conformance with the PAL system. The reproduced carrier chrominance signal having the correct chrominance sequence, is supplied to the mixing circuit 76.

Figure 20A:
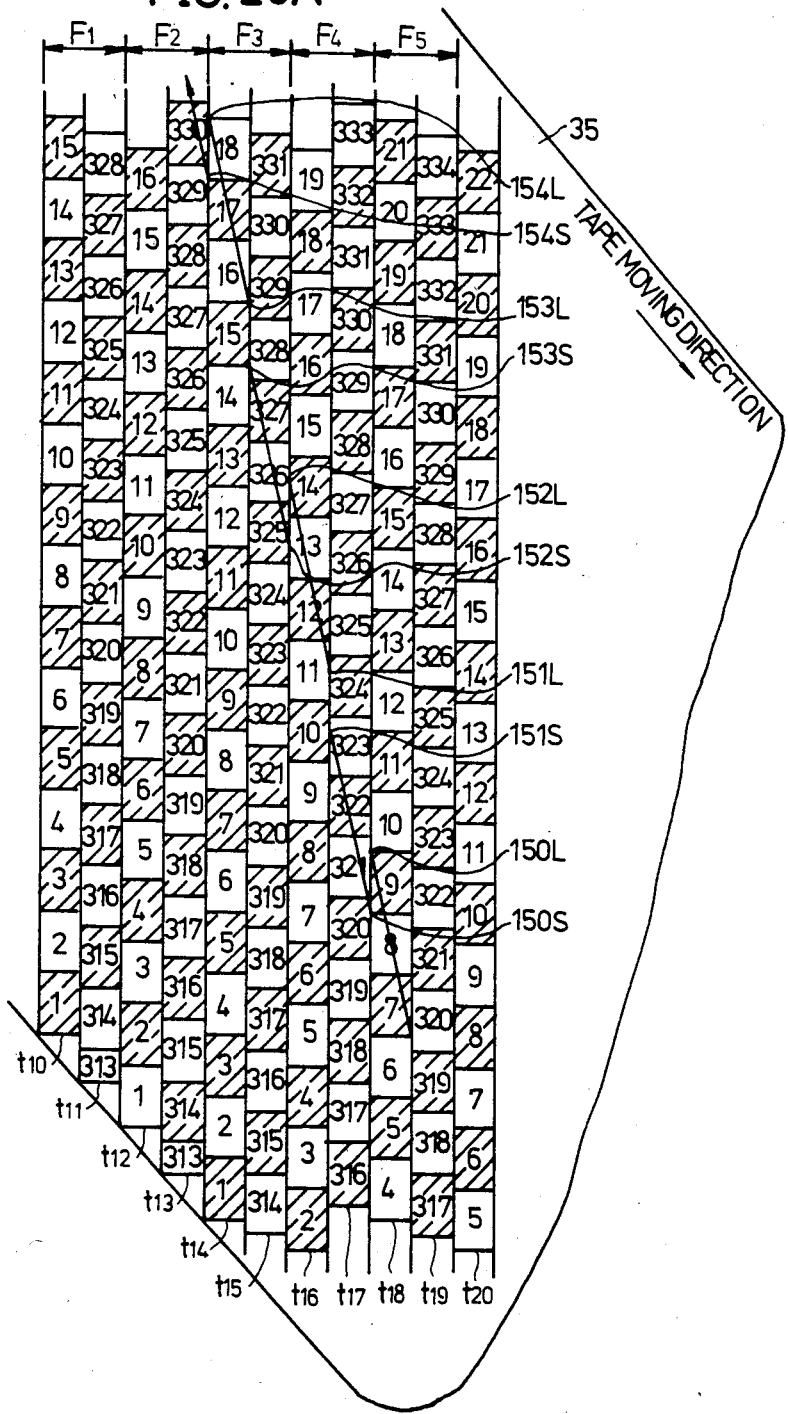
FIG. 20A shows an example of a scanning locus of a center of a head which is selected during the high-speed reverse reproduction mode in the time delay control apparatus of the present invention, together with a track pattern.

FIG. 20A shows a track pattern on the tape 35 which is recorded in the extended time mode, and scanning loci of rotary heads which are selected when this tape 35 is played in the high-speed reverse reproduction mode. The track pattern themselves shown in FIG. 20A and FIG. 21A which will be described later on in the specification, are the same as the track pattern shown in FIG. 2A. It will be assumed that a track t₁₈ which is recorded with the first one field of a fifth frame F5, is recorded with a rotary head having a gap of the same azimuth angle as the gaps of the rotary heads $H_{L2}$ and $H_{S2}$. Further, it will be assumed that the rotary heads $H_{L2}$ and $H_{S1}$ simultaneously scan over the tape 35. In this case, centers of the rotary heads $H_{L2}$ and $H_{S1}$ which are selected, move along the scanning loci indicated by solid lines in FIG. 20A. In other words, at a position 150L where the rotary head $H_{L2}$ finishes reproducing the recorded signals within the period of the scanning line number "9" in the first half of the fifth frame F5, a switching takes place so that the reproduced signal is selectively obtained from the rotary head $H_{S1}$. Because the rotary head $H_{SY}$ lags the rotary head $H_{L2}$ by a distance corresponding to the recording length of 1H in the rotating direction of the rotary body 33 as shown in FIGS. 4 through 6, the switching takes place and the reproduced signal is selectively obtained from the rotary head $H_{S1}$ from a position 150S shown in FIG. 20A. A switching takes place at a position 151S at a border between tracks t₁₇ and t₁₆, so that the reproduced signal is selectively obtained from the rotary head $H_{L2}$ which leads the rotary head $H_{S1}$ by the distance corresponding to the recording length of 1H. Thus, the rotary head $H_{L2}$ begins to reproduce the recorded signals within the period of the scanning line number "11" in the latter half of the fourth frame F4.

Similarly thereafter, a switching takes place when the rotary head $H_{L2}$ reaches a position 152L shown in FIG. 20A at a border between tracks t₁₆ and t₁₅, so that the rotary head $H_{S1}$ reproduces recorded signals from the track t₁₅ from a position 152S up to a position 153S. Next, a switching takes place so that the rotary head $H_{L2}$ reproduces recorded signals from a track t₁₄ from a position 153L up to a position 154L. Then, a switching takes place so that the rotary head $H_{S1}$ begins to reproduce recorded signals from a position 154S on a track t₁₃. As a result, a reproduced signal which is schematically shown in FIG. 20B, is produced from the switching circuit 48 shown in FIG. 7. In FIGS. 20B and 20C and FIGS. 21B and 21C which will be described later on in the specification, numbers represent the horizontal scanning line numbers of the reproduced luminance signals, hatchings represent periods in which the chrominance subcarrier of the color difference signal (R-Y) is phase inverted, and solid lines between the numbers represent positions where the horizontal synchronizing signals are reproduced.

In the output reproduced signal of the switching circuit 48, a skew of 0.25H (=1H/4) is generated at points 160₁, 160₂, 160₃, and 160₄ shown in FIG. 20B where the rotary heads $H_{L2}$ and $H_{S1}$ begin to scan over a reverse track, that is, where the switching of the rotary heads takes place. However, according to the present embodiment, the reproduced color video signal is delayed in the variable delay circuit 77 by a delay time as shown in FIG. 19(H), and this delay time is changed in the sequence of 0→¾→2/4→¼→0→¾2/4→¼→0→... (where the unit is H) every time the switching of the rotary heads $H_{L2}$ and $H_{S1}$ takes place to switch from one rotary head to the other. In addition, the reproduced carrier chrominance signal is delayed in the variable delay circuit 77 by a delay time as shown in FIG. 19(I), and this delay time is changed in the sequence of 0→1→1→1→1→0→0→0→0→1→... (where the unit is H) every time the switching of the rotary heads $H_{L2}$ and $H_{S1}$ takes place. For this reason, in the reproduced carrier chrominance signal which is obtained from the variable delay circuit 77, the phase of the chrominance subcarrier of the color difference signal (R-Y) is inverted for every 1H, and the chrominance sequence is in conformance with the PAL system. As a result, the horizontal synchronizing signals are constantly reproduced with a period of 1H. Therefore, a reproduced color video signal having the chrominance sequence and the sequence of the scanning line number which are schematically shown in FIG. 20C, is produced through an output terminal 78.

In other words, up to the position 150L shown in FIG. 20A, the reproduced signal shown in FIG. 20B is produced. During the period in which the rotary head $H_{S1}$ scans from the position 150S up to the position 151S shown in FIG. 20A, the delay time of the variable delay circuit 77 is equal to 0.75H (=3H/4), and the switching circuit 57 is connected to the terminal 57a so as to obtain the reproduced carrier chrominance signal which is delayed by 1H delay circuit 56. Hence, during this period, the signals in the scanning line numbers "320" through "323" of the fourth frame F4 shown in FIG. 20B are reproduced as shown in FIG. 20C. During the period in which the rotary head $H_{L2}$ scans from the position 151L up to the position 152L shown in FIG. 20A, the signals in the scanning line numbers "11" through "14" of the fourth frame F4 shown in FIG. 20B are reproduced, but the delay time of the variable delay circuit 77 is equal to 0.5H (=2H/4), and the switching circuit 57 is connected to the terminal 57a. Thus, during this period, the reproduced color video signal becomes as shown in FIG. 20C in which the noise corresponding to 0.5H is generated immediately before the signal in the scanning line number "14" of the fourth frame F4 is reproduced.

Similarly, during the period in which the rotary head $H_{S1}$ scans from the position 152S up to the position 153S shown in FIG. 20A, the delay time of the variable delay circuit 77 is equal to 0.25H (=1H/4) and the delay time of the reproduced carrier chrominance signal is equal to 1H. During the period in which the rotary head $H_{L2}$ scans from the position 153L up to the position 154L, the delay time of the variable delay circuit 77 is equal to 0H, and the delay time of the reproduced carrier chrominance signal is equal to 1H. Accordingly, the information content of the reproduced color video signal becomes as schematically shown in FIG. 20C.

Figure 21A:
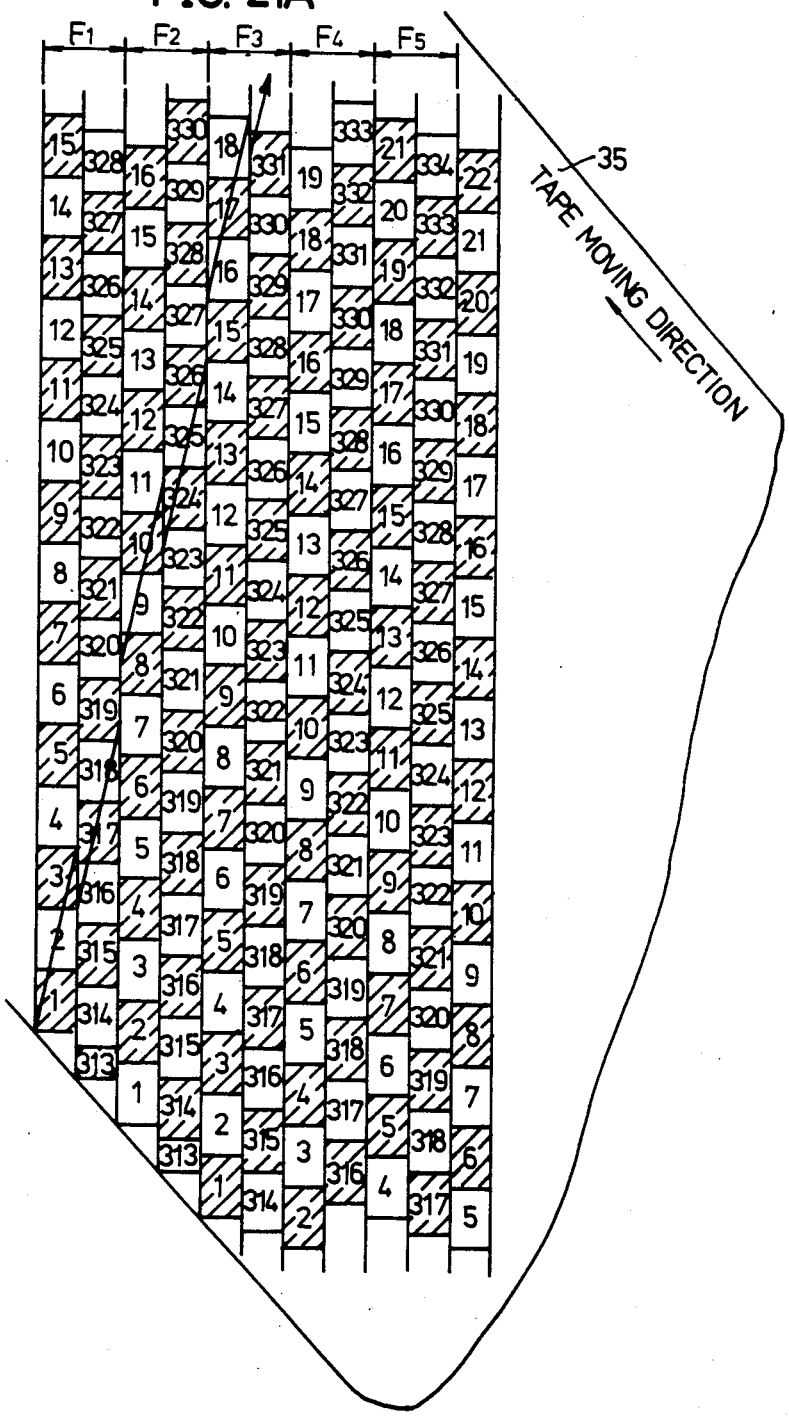
FIG. 21A shows an example of a scanning locus of a center of a head which is selected during the high-speed forward reproduction mode in the time delay control apparatus of the present invention, together with a track pattern.

As indicated by a mark "X" in FIG. 20C, the video information of the reproduced color video signal in a period of 0H to 3H/4 immediately after the switching of the rotary heads takes place, is replaced by the video information immediately prior thereto, and a noise part is generated. However, in actual practice, the high-speed reproduction is performed with a speed which is in the order of ten times the speed with which the tape is moved at the time of the recording, and such a noise part can essentially be neglected in the reproduced picture. In FIGS. 20A and 21A, the scanning loci of the rotary heads are shown for high-speed reproductions performed with a speed which is 100 times the speed with which the tape is moved at the time of the recording, for convenience' sake only so as to simplify the drawings, and such high-speed reproductions in the order of 100 times is not carried out in actual practice. As may be seen from FIG. 20C, the horizontal synchronizing signals are generally reproduced with a period of 1H, and the skew is not generated. Accordingly, the chrominance sequence is correct, and it is possible to obtain a reproduced picture of a satisfactory picture quality during the high-speed reverse reproduction mode.

Next, description will be given with respect to a case where the tape 35 is played in the high-speed forward reproduction mode. In this case, the head selection signal described before, is applied to the input terminal 130 of the delay control signal generating circuit 72 shown in FIG. 18. Thus, the output signal waveform of the inverter 131 becomes as shown in FIG. 19(A) within a range $T_2$. In addition, among the input terminals $70_3$ through $70_6$, the signal level becomes high at the input terminals $70_4$ and $70_6$. Consequently, a signal shown in FIG. 19(B) in the range $T_2$ is applied to the respective reset terminals of the flip-flops 142 and 144. The inverter 133 receives a signal shown in FIG. 19(C) in the range $T_2$, and the exclusive-OR circuit 132 produces a signal shown in FIG. 19(D) in the range $T_2$. A signal shown in FIG. 19(E) in the range $T_2$ is produced through the $Q_1$-output terminal of the flip-flop 142, and a signal shown in FIG. 19(F) in the range $T_2$ is produced from the exclusive-OR circuit 143. As a result, a control signal shown in FIG. 19(G) in the range $T_2$ is produced through the output terminal 73.

Accordingly, the delay time of the variable delay circuit 77 changes as shown in FIG. 19(H) within the range $T_2$. Further, the delay time of the reproduced carrier chrominance signal changes dependent on the 1H delay circuit 56 and the switching circuit 57, as shown in FIG. 19(I) within the range $T_2$.

Therefore, the rotary heads $H_{L2}$ (or $H_{L1}$) and $H_{S1}$ (or $H_{S2}$) are selected, and centers of the scanning loci of the selected rotary heads become as indicated by solid lines in FIG. 21A, for example. In this case, the output reproduced signal of the switching circuit 48 becomes as schematically shown in FIG. 21B, and a skew of 0.25H is constantly generated at points $170_1$, $170_2$, $170_3$, and $170_4$ where the switching of the rotary heads takes place. However, as in the case of the high-speed reverse reproduction mode, the delay times are controlled as shown in FIGS. 19(H) and 19(I) in the range $T_2$. If the period from one switching of the rotary heads to the subsequent switching of the rotary heads is taken as one unit, the delay times are controlled with a period which corresponds to eight of such units, as may be seen from FIGS. 19(H) and 19(I) in the range $T_2$. As a result, a reproduced color video signal which is schematically shown in FIG. 21C, in which the skew is not generated and the chrominance sequence is correct, is produced through the output terminal 78.

During a normal reproduction in the extended time mode, the output signal of the inverter 131 shown in FIG. 18 assumes a low level as shown in FIG. 19(A) within a range $T_3$. In this case, the signal level is high at the input terminal $70_4$, and the signal levels are low at the input terminals $70_3$, $70_5$, and $70_6$. Hence, the output signal of the inverter 134 assumes a high level as shown in FIG. 19(B) within the range $T_3$. The input signal of the inverter 133, the output signal of the flip-flop 142, and the output signal of the exclusive-OR circuit 143 respectively assume a low level as shown in FIGS. 19(C), 19(E), and 19(F) within the range $T_3$. On the other hand, the output signal of the exclusive-OR circuit 132 and the control signal produced through the output terminal 73, respectively assume a high level as shown in FIGS. 19(D) and 19(G) within the range $T_3$. Thus, the delay time of the variable delay circuit 77, and the delay time of the reproduced carrier chrominance signal which is supplied to the mixing circuit 76, are respectively equal to zero as shown in FIGS. 19(H) and 19(I) within the range $T_3$. In other words, the rotary heads will not scan over a reverse track during the normal reproduction, and for this reason, the operation of controlling the delay times is stopped.

As described heretofore, the circuit part reaching the delay control signal generating circuit 72 from the comparator 60, performs a digital signal processing. Accordingly, it is relatively easy to make this circuit part in the form of an integrated circuit. In addition, the logic operations may be performed by use of a microprocessor, and the circuit construction may be simplified.

The present invention is not limited to the case where the distance between the gaps of the two rotary heads constituting the double-gap head is equal a distance which corresponds to a period of 1H, and this distance may be equal to a distance which corresponds to a period of several H. The following table 3 shows the quantity and sequence of the delay times for high-speed reproductions carried out in the extended time mode and the standard mode, with respect to a magnetic tape having a track pattern shown in FIG. 2A in which the shift of 0.75H exists, for the case where the distance between the gaps of the two rotary heads corresponds to a period of 1H, and for the case where the distance between the gaps of the two rotary heads corresponds to a period of 2H. In the table 3, the numbers under a column "Y+C" indicate the delay times of the variable delay circuit 77, and the numbers under a column "C" indicate the delay times of the reproduced carrier chrominance signal which is supplied to the mixing circuit 76. Further, in the table 3, the unit of the delay times is H.

TABLE 3

| | | Extended time mode | | | | Standard mode | | | |
|---|---|---|---|---|---|---|---|---|---|
| | | High-speed Forward | | High-speed Reverse | | High-speed Forward | | High-speed Reverse | |
| | | Y+C | C | Y+C | C | Y+C | C | Y+C | C |
| Distance between gaps of two rotary heads | 1H | 0 | 0 | 0 | 0 | 0 | 1 | 0 | 1 |
| | | 1/4 | 0 | 3/4 | 1 | 0 | 0 | 0 | 0 |
| | | 2/4 | 0 | 2/4 | 1 | 0 | 1 | 0 | 1 |
| | | 3/4 | 0 | 1/4 | 1 | 0 | 0 | 0 | 0 |
| | | 0 | 1 | 0 | 1 | 0 | 1 | 0 | 1 |
| | | 1/4 | 1 | 3/4 | 0 | 0 | 0 | 0 | 0 |
| | | 2/4 | 1 | 2/4 | 0 | 0 | 1 | 0 | 1 |
| | | 3/4 | 1 | 1/4 | 0 | 0 | 0 | 0 | 0 |
| | 2H | 0 | 0 | 0 | 0 | 0 | 0 | 0 | 0 |
| | | 1/4 | 1 | 3/4 | 0 | 0 | 0 | 0 | 0 |
| | | 2/4 | 0 | 2/4 | 1 | 0 | 0 | 0 | 0 |
| | | 3/4 | 1 | 1/4 | 0 | 0 | 0 | 0 | 0 |
| | | 0 | 0 | 0 | 1 | 0 | 0 | 0 | 0 |
| | | 1/4 | 1 | 3/4 | 1 | 0 | 0 | 0 | 0 |
| | | 2/4 | 0 | 2/4 | 0 | 0 | 0 | 0 | 0 |
| | | 3/4 | 1 | 1/4 | 1 | 0 | 0 | 0 | 0 |

As may be seen from the table 3, in the case where the distance between the gaps of the two rotary heads corresponds to a period of 2H, there is an advantage in that no delay is required during the high-speed reproduction in the normal mode. However, there is a disadvantage in that the manner in which the delay times are changed is completely different for the high-speed forward reproduction in the extended time mode and the high-speed reverse reproduction in the extended time mode.

The present inventors have examined the delay times for a case where the distance between the gaps of the two rotary heads corresponds to a period of 5H/4, for example. However, by taking into consideration the similarity between the manners in which the delay times are changed (periodicity of the changing of the delay times) during the high-speed forward reproduction and the high-speed reverse reproduction, and the fact that the shift of the reproduced picture in the vertical direction is large when the distance between the gaps of the two rotary heads is large, an optimum distance between the gaps of the two rotary heads is equal to a distance corresponding to a period of 1H.

In the embodiments described heretofore, it was described that the PAL system color video signal is reproduced. However, the present invention may be applied to the reproduction of a color video signal in which the phase or frequency of the chrominance subcarrier of the carrier chrominance signal changes for every 1H. Thus, the present invention may be applied to the reproduction of a SECAM system color video signal. The present invention may also be applied to the reproduction of a black-and-white video signal. In addition, the first variable delay circuit which is constituted by the 1H delay circuit 56 and the switching circuit 57 shown in FIG. 7, may be provided in an input stage of the chrominance signal processing circuit 54. It is not essential to employ a double-gap head, and moreover, one of the two rotary heads which constitute the double-gap head may be used for other purposes such as for carrying out a changed speed reproduction.

Further, the present invention is not limited to these embodiments, but various variations and modifications may be made without departing from the scope of the present invention.

What is claimed is:

1. A delay time adjusting system for a video signal reproducing apparatus which has a plurality of pairs of rotary heads, each pair of said plurality of pairs of rotary heads having gaps of mutually different azimuth angles and being arranged close to each other, said magnetic tape having a track pattern in which a video signal is frequency-modulated and recorded at the time of a recording by rotary heads having gaps of mutually different azimuth angles and recorded positions of horizontal synchronizing signals are shifted in the longitudinal direction of tracks and are not aligned between mutually adjacent tracks, said delay time adjusting system comprising:

comparing means for comparing levels of reproduced signals from one predetermined pair of rotary heads among said plurality of pairs of rotary heads, said predetermined pair of rotary heads simultaneously scanning over a magnetic tape which moves at a tape speed which is different from the tape speed of the magnetic tape at the time of the recording;

switching means for selectively passing one of the reproduced signals from said predetermined pair of rotary heads;

signal processing means for subjecting the reproduced signal which is selectively passed through said switching means to a signal processing, and for obtaining a reproduced video signal;

head selecting means responsive to an output signal of said comparing means, for producing a head selection signal which indicates which one of the reproduced signals has a greater level, said head selection signal being supplied to said switching means so that said switching means passes one of the reproduced signals that has a greater level than that of the other of the reproduced signals, said switching means carrying out a switching operation for switching over the reproduced signals a plurality of times during each field of the reproduced video signal;

a variable delay circuit for delaying the reproduced video signal from said signal processing means by a delay time; and a delay control signal generating circuit supplied with said head selection signal from said head selecting means and mode signals indicative of a reproducing mode for generating control signals and for variably adjusting the delay time of said variable delay circuit each time said switching means carries out the switching operation so that a horizontal synchronizing signal within an output signal of said variable delay circuit has a constant period.

2. A delay time adjusting system as claimed in claim 1 in which said magnetic tape is recorded with a frequency modulated luminance signal and a frequency converted carrier chrominance signal, said frequency modulated luminance signal being a luminance signal of a PAL or SECAM system color video signal and being frequency-modulated, said frequency converted carrier chrominance signal being a carrier chrominance signal of the PAL or SECAM system color video signal and being frequency-converted into a low frequency band, said signal processing means comprises luminance signal reproducing means for demodulating a reproduced frequency modulated luminance signal and for subjecting a demodulated signal to a predetermined signal processing, carrier chrominance signal reproducing means for obtaining from a reproduced frequency converted carrier chrominance signal a reproduced carrier chrominance signal which is in an original frequency band, variable delay means for selectively delaying the reproduced carrier chrominance signal from said carrier chrominance signal reproducing means or the reproduced frequency converted carrier chrominance signal by a delay time of one horizontal scanning period, and a mixing circuit for mixing the reproduced luminance signal from said luminance signal reproducing means and the reproduced carrier chrominance signal which is selectively delayed in said variable delay means and is returned to the original frequency band, and said delay control signal generating circuit comprises means for generating first and second control signals, for supplying said first control signals to said variable delay circuit, for supplying said second control signal to said variable delay means so as to variably control the delay time of said variable delay means, and for producing the reproduced carrier chrominance signal or the reproduced frequency converted carrier chrominance signal having a chrominance sequence which is corrected by said variable delay means.

3. A delay time adjusting system as claimed in claim 1 in which said switching means selectively posses the reproduced signal from one of said predetermined pair of rotary heads having a wider track width than the other rotary head, for a period which is longer than a period in which the reproduced signal from said other rotary head is selectively produced.

4. A delay time adjusting system as claimed in claim 1 in which said comparing means comprises highpass filter means for comparing levels of high-frequency components of the reproduced frequency modulated signals from said predetermined pair of rotary heads.

5. A delay time adjusting system as claimed in claim 1 in which said predetermined pair of rotary heads are arranged with a separation which is within several times the recording length of one horizontal scanning period on the magnetic tape.

6. A delay time adjusting system as claimed in claim 5 in which said predetermined pair of rotary heads are made up of a double-gap head comprising a rotary head for extended time mode play having a small track width and a rotary head for standard mode play having a large track width.

7. A delay time adjusting system for a video signal reproducing apparatus which has a plurality of pairs of rotary heads, each pair of said plurality of pairs of rotary heads having gaps of mutually azimuth angles and being arranged close to each other, said magnetic tape having a track pattern in which a video signal is frequency-modulated and recorded at the time of a recording by rotary heads having gaps of mutually different azimuth angles and recorded positions of horizontal synchronizing signals are shifted in the longitudinal direction of tracks and are not aligned between mutually adjacent tracks, said delay time adjusting system comprising:

comparing means for comparing levels of reproduced frequency modulated signals produced from one predetermined pair of rotary heads among said plurality of pairs of rotary heads, said predetermined pair of rotary heads simultaneously scanning over a magnetic tape which moves at a tape speed which is different from the tape speed of the magnetic tape at the time of the recording;

head selecting means responsive to an output signal of said comparing means for selectively producing one of the reproduced signals from said predetermined pair of rotary heads, said one of the reproduced signals having a greater level than that of the other of the reproduced signals from said predetermined pair of rotary heads, said head selecting means comprising an integrating circuit for integrating the output signal of said comparing means, a signal generating circuit supplied with an output signal of said integrating circuit, and for generating a signal in synchronism with a frequency component which is related to the number of times said predetermined pair of rotary heads scan across the tracks on the magnetic tape, and a comparing circuit for comparing the signal from said signal generating circuit and a reference voltage;

signal processing means or subjecting the reproduced signal which is selectively produced from said head selecting means to a signal processing, and for obtaining a reproduced video signal;

a variable delay circuit for delaying the reproduced video signal from said signal processing means by a delay times; and a delay control signal generating circuit supplied with a head selection signal obtained from said head selecting means and mode signals indicative of a reproducing mode, said head selection signal indicating said one rotary head which is producing the reproduced signal with the greater level, said delay control signal generating circuit generating control signals responsive to the signals supplied thereto, and variably controlling the delay time of said variable delay circuit so that said variable delay circuit produces a reproduced video signal in which reproduced horizontal synchronizing signals have a constant period.

8. A delay time adjusting system as claimed in claim 7 in which said signal generating circuit comprises a phase locked loop which is constituted by a variable frequency oscillator having a center frequency which is related to the number of times said predetermined pair of rotary heads scan across the tracks on the magnetic tape, and a phase comparator for comparing the phase of an output signal of said variable frequency oscillator and the phase of the output signal of said integrating circuit, and for supplying a signal which is dependent on a phase difference between the two signals to said variable frequency oscillator so as to variably control an output oscillation frequency of said variable frequency oscillator.

9. A delay time adjusting system as claimed in claim 8 in which said center frequency of said variable frequency oscillator is set responsive to an output voltage of a voltage generator which generates the output voltage responsive to capstan rotation detection pulses having a repetition frequency dependent on a rotational speed of a capstan.

10. A delay time adjusting system for a video signal reproducing apparatus which has a plurality of pairs of rotary heads, each pair of said plurality of pairs of rotary heads having gaps of mutually different azimuth angles and being arranged close to each other, said magnetic tape having a track pattern in which a video signal is frequency-modulated and recorded at the time of a recording by rotary heads having gaps of mutually different azimuth angles and recorded positions of horizontal synchronizing signals are shifted in the longitudinal direction of tracks and are not aligned between mutually adjacent tracks, said magnetic tape being recorded with a frequency modulated luminance signal and a frequency converted carrier chrominance signal, said frequency modulated luminance signal being a luminance signal of a PAL or SECAM system color video signal and being frequency-modulated, said frequency converted carrier chrominance signal being a carrier chrominance signal of the PAL. or SECAM system color video signal and being frequency-converted into a low frequency band, said delay time adjusting system comprising:

comparing means for comparing levels of reproduced frequency modulated signals produced from one predetermined pair of rotary heads among a plurality of pairs of rotary heads, said predetermined pair of rotary heads simultaneously scanning over a magnetic tape which moves at a tape speed which is different from the speed of the magnetic tape at the time of the recording;

head selecting means responsive to an output signal of said comparing means for selectively producing one of the reproduced signals from said predetermined pair of rotary heads, said one of the reproduced signals from said predetermined pair of rotary heads having a greater level than that of the other of the reproduced signals from said predetermined pair of rotary heads;

signal processing means for subjecting the reproduced signal which is selectively produced from said head selecting means to a signal processing, and for obtaining a reproduced video signal, said signal processing means comprises luminance signal reproducing means for demodulating a reproduced frequency modulated luminance signal and for subjecting the demodulated signal to a predetermined signal processing, carrier chrominance signal reproducing means for obtaining from a reproduced frequency converted carrier chrominance signal a reproduced carrier chrominance signal which is in an original frequency band, variable delay means for selectively delaying the reproduced carrier chrominance signal from said carrier chrominance signal reproducing means or the reproduced frequency converted carrier chrominance signal by a delay time of one horizontal scanning period, and a mixing circuit for mixing the reproduced luminance signal from said luminance signal reproducing means and the reproduced carrier chrominance signal which is selectively delayed in said variable delay means and is returned to the original frequency band;

a variable delay circuit for delaying the reproduced video signal from said signal processing means by a delay time; and a delay control signal generating circuit supplied with a head selection signal obtained from said head selecting means and mode signals indicative of a reproducing mode, said head selection signal indicating said one rotary head which is producing the reproduced signal with the greater level, said delay control signal generating circuit comprising means for generating first and second control signals, for supplying said first control signals to said variable delay circuit so as to variably control the delay time of said variable delay circuit so that said variable delay circuit produces a reproduced video signal in which reproduced horizontal synchronizing signals have a constant period for supplying said second control signal to said variable delay means so as to variably control the delay time of said variable delay means, and for producing the reproduced carrier chrominance signal or the reproduced frequency converted carrier chrominance signal having a chrominance sequence which is corrected by said variable delay means, said delay control signal generating circuit comprising a waveform shaping circuit for producing a first signal whose phase is the same or is inverted compared to the phase of said head selection signal during a high-speed reproduction mode depending on the moving direction of the magnetic tape, first frequency dividing means for frequency-dividing the output first signal of said waveform shaping circuit by ½, second frequency dividing means for producing a second signal whose phase is the same or is inverted compared to the phase of the output signal of said first frequency dividing means depending on the moving direction of the magnetic tape, and for frequency-dividing the second signal by ½, means for producing an output signal of said second frequency dividing means as said second control signal during the high-speed reproduction mode, and means for producing said head selection signal and the output signal of said first frequency dividing means as said first control signals, and for variably controlling the delay time of said variable delay circuit to one of four kinds of delay times depending on a logical combination of said head selection signal and the output signal of said first frequency dividing means.

* * * * *